US010837642B2

(12) United States Patent
Mitani et al.

(10) Patent No.: US 10,837,642 B2
(45) Date of Patent: Nov. 17, 2020

(54) COMBUSTOR NOZZLE, GAS TURBINE COMBUSTOR, GAS TURBINE, COVER RING, AND COMBUSTOR NOZZLE MANUFACTURING METHOD

(71) Applicant: MITSUBISHI HITACHI POWER SYSTEMS, LTD., Kanagawa (JP)

(72) Inventors: Masaki Mitani, Kanagawa (JP);
Koshiro Fukumoto, Kanagawa (JP);
Toshihiko Saito, Tokyo (JP); Mitsunori Isono, Tokyo (JP); Dai Morishige, Tokyo (JP); Nobuyuki Izutsu, Kanagawa (JP); Hiroyuki Yamasaki, Kanagawa (JP); Yoshiyuki Wada, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 254 days.

(21) Appl. No.: 15/738,200

(22) PCT Filed: Jun. 8, 2016

(86) PCT No.: PCT/JP2016/067083
§ 371 (c)(1),
(2) Date: Dec. 20, 2017

(87) PCT Pub. No.: WO2017/006690
PCT Pub. Date: Jan. 12, 2017

(65) Prior Publication Data
US 2018/0187891 A1 Jul. 5, 2018

(30) Foreign Application Priority Data
Jul. 3, 2015 (JP) .................. 2015-134516

(51) Int. Cl.
*F23R 3/28* (2006.01)
*F23R 3/14* (2006.01)
(Continued)

(52) U.S. Cl.
CPC ............. *F23R 3/286* (2013.01); *F02C 3/04* (2013.01); *F02C 7/232* (2013.01); *F23R 3/14* (2013.01);
(Continued)

(58) Field of Classification Search
CPC .... F23R 3/286; F23R 3/28; F23R 3/32; F23R 3/343; F23R 3/12; F23R 3/14; F23N 2227/22
See application file for complete search history.

(56) References Cited

U.S. PATENT DOCUMENTS 4,695,247 A   9/1987   Enzaki et al.
5,351,489 A   10/1994  Okamoto et al.
(Continued)

FOREIGN PATENT DOCUMENTS

CN   101769533   7/2010
CN   103210257   7/2013
(Continued)

OTHER PUBLICATIONS

Written Opinion of the International Searching Authority dated Jul. 12, 2016 in International Application (PCT) No. PCT/JP2016/067083.
(Continued)

*Primary Examiner* — Steven M Sutherland
(74) *Attorney, Agent, or Firm* — Wenderoth, Lind & Ponack, L.L.P.

(57) ABSTRACT

Provided are a combustor nozzle, a gas turbine combustor, a gas turbine, a cover ring, and a combustor nozzle manufacturing method. The combustor nozzle includes: a nozzle
(Continued)

body provided with a fuel flow passage; a cover ring that is disposed on an outer side of the nozzle body so as to form air flow passages that allow air to jet out toward a front side; and fuel injection nozzles that are provided in a leading end part of the nozzle body at predetermined intervals in a circumferential direction and extend through the cover ring so as to be able to inject fuel from the fuel flow passage toward the front side. The cover ring has an outer circumferential surface cover that covers an outer circumferential surface of the nozzle body, a leading end surface cover that covers a leading end surface of the nozzle body, and a plurality of inclined flow passages that extend through the leading end surface cover in a thickness direction and are inclined in a predetermined direction relative to a direction of a central axis.

21 Claims, 21 Drawing Sheets

(51) Int. Cl.
  *F02C 7/232* (2006.01)
  *F23R 3/32* (2006.01)
  *F02C 3/04* (2006.01)
  *F23R 3/34* (2006.01)
(52) U.S. Cl.
  CPC .................. *F23R 3/28* (2013.01); *F23R 3/32* (2013.01); *F23R 3/343* (2013.01); *F05D 2220/32* (2013.01); *F05D 2240/35* (2013.01); *F23N 2227/22* (2020.01); *F23N 2241/20* (2020.01)

(56) References Cited

U.S. PATENT DOCUMENTS

| | | | |
|---|---|---|---|
| 6,145,319 | A | 11/2000 | Burns et al. |
| 6,460,326 | B2* | 10/2002 | Bechtel ................... F23D 14/22 |
| | | | 60/39.465 |
| 8,479,519 | B2 | 7/2013 | Chen et al. |
| 8,826,666 | B2 | 9/2014 | Kajimura et al. |
| 2002/0061485 | A1 | 5/2002 | Mandai et al. |
| 2007/0033919 | A1* | 2/2007 | Tanimura .............. F23D 17/002 |
| | | | 60/39.463 |
| 2010/0170249 | A1 | 7/2010 | Chen et al. |
| 2012/0180490 | A1* | 7/2012 | Takami .................... F23R 3/14 |
| | | | 60/740 |

FOREIGN PATENT DOCUMENTS

| | | |
|---|---|---|
| EP | 2 693 123 | 2/2014 |
| JP | 61-2313301 | 10/1986 |
| JP | 2000-130758 | 5/2000 |
| JP | 2002-156115 | 5/2002 |
| JP | 2002-340307 | 11/2002 |
| JP | 2009-168397 | 7/2009 |
| JP | 2010-159757 | 7/2010 |
| KR | 10-2013-0066691 | 6/2013 |
| WO | 2012/133774 | 10/2012 |

OTHER PUBLICATIONS

Office Action dated Mar. 25, 2019 in corresponding Chinese Patent ApplicationNo. 201680036468.3 with Machine translation.
Notification of Reasons for Refusal dated Apr. 4, 2019 in corresponding Korean Patent Application No. 10-2017-7036737 with Machine translation.
Extended European Search Report dated Feb. 4, 2019 in European Application No. 16821161.3.

* cited by examiner

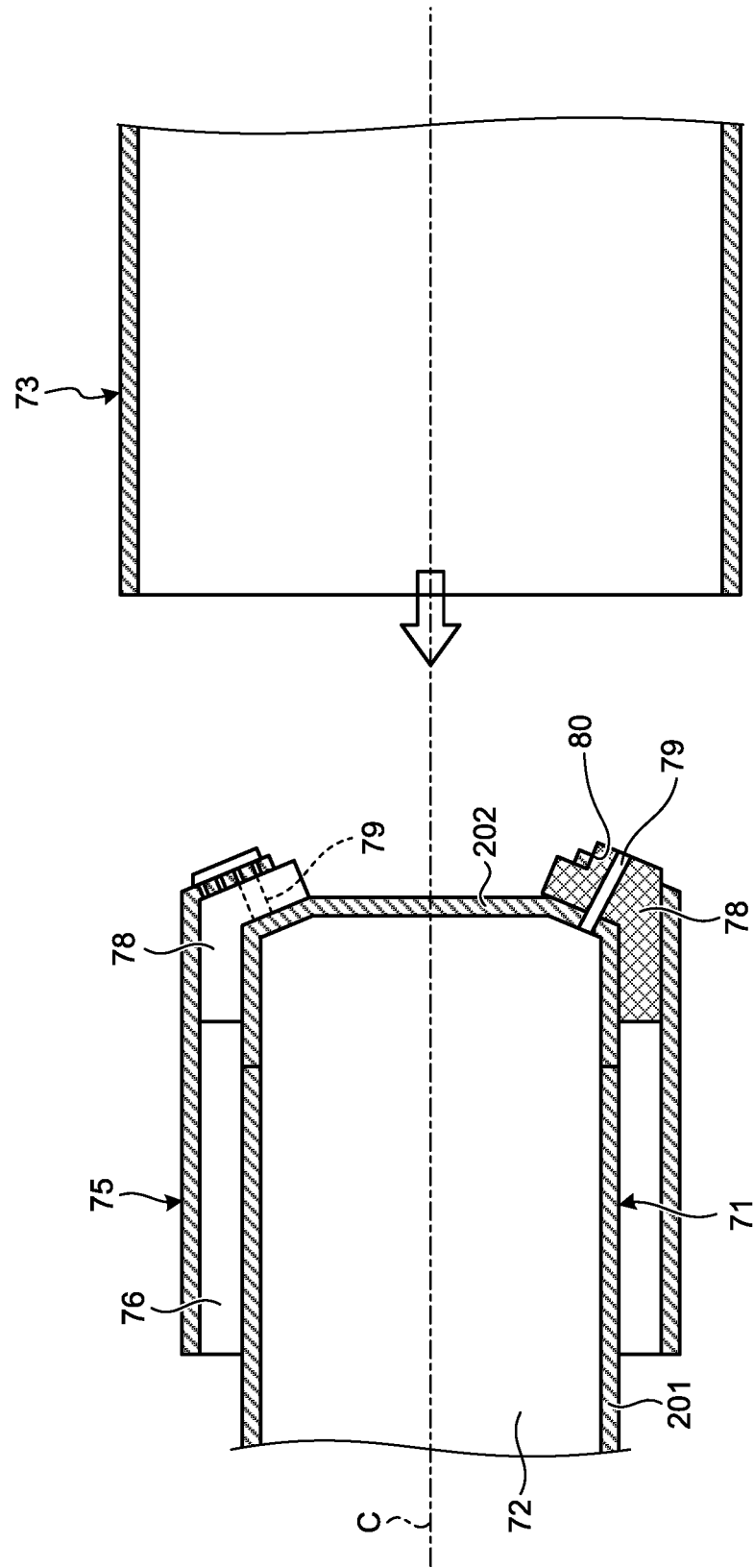

COMBUSTOR NOZZLE, GAS TURBINE COMBUSTOR, GAS TURBINE, COVER RING, AND COMBUSTOR NOZZLE MANUFACTURING METHOD

TECHNICAL FIELD

The present invention relates to a combustor nozzle intended for diffusion combustion, a gas turbine combustor including this combustor nozzle, a gas turbine equipped with this gas turbine combustor, a cover ring, and a combustor nozzle manufacturing method.

BACKGROUND ART

A typical gas turbine is composed of a compressor, a combustor, and a turbine. In the compressor, air taken in through an air intake opening is compressed into high-temperature, high-pressure compressed air, and in the combustor, fuel is supplied to this compressed air and the mixture is combusted to produce high-temperature, high-pressure combustion gas (working fluid). This combustion gas drives the turbine, which in turn drives a generator coupled to the turbine.

In the combustor of the gas turbine, a plurality of main combustion burners are disposed so as to surround a pilot combustion burner. A pilot nozzle is built inside the pilot combustion burner and a main nozzle is built inside the main combustion burner, and the pilot combustion burner and the plurality of main combustion burners are disposed inside a combustor basket of the gas turbine. As the pilot nozzle is disposed at a central part, a high-temperature flame is formed in the vicinity of a leading end part of the pilot nozzle, and this leading end part is heated by the flame to a high temperature.

One example of devices for cooling the leading end part of a pilot nozzle is described in Patent Literature below. In the gas turbine combustor described in Patent Literature 1, a plurality of through-holes extending through a cover ring in a thickness direction are provided in a periphery of each nozzle tip to thereby form an air layer that has a heat insulating effect.

CITATION LIST

Patent Literature

Patent Literature 1: Japanese Patent Laid-Open No. 2009-168397

SUMMARY OF INVENTION

Technical Problem

The pilot nozzle jets out fuel gas toward the front side, and jets out air toward the inner side of the fuel gas as well as toward the outer side of the fuel gas. This jet of air forms a circulating current heading for the fuel gas on the downstream side, and the fuel gas and the air are mixed together and combusted in the vicinity of the cover ring. Thus, the combustion stability is enhanced. In the above conventional gas turbine combustor, air is jetted out of the plurality of through-holes, formed in the cover ring, along a central axis direction of the pilot nozzle. Then, the air jetted out of the plurality of through-holes blows off the flame too far away from the cover ring, which reduces the combustion stability.

Having been contrived to solve the above problem, the present invention aims to provide a combustor nozzle that has achieved improvement in cooling performance of the leading end part while securing combustion stability, a gas turbine combustor, a gas turbine, a cover ring, and a combustor nozzle manufacturing method.

Solution to Problem

A combustor nozzle of the present invention to achieve the above object includes: a nozzle body that is provided with a fuel flow passage and extends in a rod shape; a cover ring that is disposed on an outer side of an outer circumference of a leading end of the nozzle body with a predetermined clearance thereto so as to form an air flow passage that allows air to jet out toward a front side; and fuel injection nozzles that are provided in a leading end part of the nozzle body at predetermined intervals in a circumferential direction and extend through the cover ring so as to be able to inject fuel from the fuel flow passage toward the front side, wherein the cover ring has an outer circumferential surface cover that has a cylindrical shape and covers an outer circumferential surface of the nozzle body, a leading end surface cover that has an annular shape and covers a leading end surface of the nozzle body, and inclined flow passages that extend through the leading end surface cover in a thickness direction and are inclined in a predetermined direction relative to a central axis direction of the nozzle body.

Thus, air can be jetted out toward the front side through the air flow passage provided between the nozzle body and the cover ring, and the fuel can be injected by the fuel injection nozzles from the fuel flow passage of the nozzle body toward the front side. The combustion stability is secured as the fuel gas is combusted while being diffused by the jet of air. Here, the air is jetted out of the inclined flow passages provided in the leading end surface cover of the cover ring, so that this jet of air flows along a front surface of the leading end surface cover and thereby keeps a flame at an appropriate distance. As a result, the cover ring is prevented from reaching a high temperature, and it is possible to improve cooling performance of the leading end part while securing the combustion stability.

In the combustor nozzle of the present invention, the inclined flow passages are inclined along the circumferential direction of the cover ring.

Thus, if the inclined flow passages are inclined along the circumferential direction of the cover ring, air jetted out of these inclined flow passages flows in the circumferential direction along the front surface of the leading end surface cover, and the cover ring can be efficiently cooled with this jet of air.

The combustor nozzle of the present invention further includes a swirling force application part that applies a swirling force to an air current flowing through the air flow passage, and the inclined flow passages are inclined along a direction in which air is swirled by the swirling force application part.

Thus, if the inclined flow passages are inclined along the air swirling direction, air jetted out of these inclined flow passages flows over the front surface of the leading end surface cover along the air swirling direction. Accordingly, the air from the inclined flow passages does not adversely affect the swirling air, and it is possible to efficiently cool the cover ring while securing the combustion stability.

In the combustor nozzle of the present invention, the inclined flow passages are composed of a plurality of inclined flow passages having different inclination angles.

Thus, if the plurality of inclined flow passages having different inclination angles are provided, air jetted out of these inclined flow passages flows over a wide area of the front surface of the leading end surface cover, so that the cover ring can be efficiently cooled.

In the combustor nozzle of the present invention, the inclination angles of the plurality of inclined flow passages are set so as to become larger toward a downstream side in the direction in which air is swirled by the swirling force application part.

Thus, if the inclination angles of the inclined flow passages are set so as to become larger toward the downstream side in the air swirling direction, the inclination angle of each inclined flow passage can be set to an angle according to a surrounding structure, and a larger number of the inclined flow passages can be provided at a desired position in the leading end surface cover.

In the combustor nozzle of the present invention, the inclined flow passages are inclined relative to a direction perpendicular to a surface of the cover ring.

Thus, if the inclined flow passages are inclined relative to the direction perpendicular to the surface of the cover ring, air jetted out of these inclined flow passages can flow efficiently along the front surface of the leading end surface cover.

In the combustor nozzle of the present invention, the inclined flow passages are through-holes that extend through the cover ring in a plate thickness direction.

Thus, if the inclined flow passages are through-holes, the structure of the combustor nozzle can be simplified and the ease of manufacturing thereof can be improved.

In the combustor nozzle of the present invention, the inclined flow passages are slits that extend through the cover ring in the plate thickness direction and extend along a radial direction of the cover ring.

Thus, if the inclined flow passages are slits, a large passage area can be secured, so that a larger amount of air jetted out of the inclined flow passages can flow along the front surface of the leading end surface cover, and thereby the cooling performance can be improved.

In the combustor nozzle of the present invention, one end in a longitudinal direction of each of the slits is open in an inner circumference of the leading end surface cover.

Thus, if the slits are open in the inner circumference of the leading end surface cover, the structure of the combustor nozzle can be simplified and the ease of manufacturing thereof can be improved.

In the combustor nozzle of the present invention, the leading end surface cover is provided with a first front surface that is orthogonal to the central axis direction and a second front surface that is inclined relative to a direction orthogonal to the central axis direction, and the inclined flow passages are open in the first front surface and the second front surface.

Thus, if the inclined flow passages are open in the two front surfaces having different angles, air jetted out of these inclined flow passages can flow efficiently along the front surfaces of the leading end surface cover.

In the combustor nozzle of the present invention, an inclination direction of the inclined flow passages provided in the first front surface and an inclination direction of the inclined flow passages provided in the second front surface are different from each other.

Thus, if the inclination directions of the inclined flow passages provided in the two front surfaces are different from each other, air jetted out of these inclined flow passages flows over a wide area of the front surfaces of the leading end surface cover, so that the cooling performance can be improved.

In the combustor nozzle of the present invention, the inclined flow passages extend along the radial direction of the cover ring and are inclined so as to face the central axis direction.

Thus, if the inclined flow passages are inclined along the radial direction of the cover ring so as to face the central axis direction, air jetted out of these inclined flow passages cools the front surface of the leading end surface cover, and then this air appropriately merges with air jetted out of the air flow passage, so that the combustion stability can be secured.

In the combustor nozzle of the present invention, the cover ring has a plurality of grooves that are provided in a rear surface of the leading end surface cover and extend along the radial direction of the leading end surface cover.

Thus, if the plurality of grooves are provided in the rear surface of the leading end surface cover, the area of contact with air increases, so that the cooling performance of the cover ring can be improved.

A gas turbine combustor of the present invention includes: a cylinder in which high-pressure air and fuel are combusted to generate combustion gas; a pilot combustion burner that is disposed at a central part inside the cylinder; and a plurality of main combustion burners that are disposed so as to surround the pilot combustion burner inside the cylinder, wherein the pilot combustion burner has the above-described combustor nozzle.

Thus, the cover ring of the combustor nozzle is provided with the inclined flow passages, so that air jetted out of these inclined flow passages does not hinder the flow of air jetted out of the air flow passage. Accordingly, the cover ring is prevented from reaching a high temperature, and it is possible to improve the cooling performance of the leading end part while securing the combustion stability.

A gas turbine of the present invention includes: a compressor that compresses air; the gas turbine combustor that mixes together compressed air compressed by the compressor and fuel and combusts the mixture; and a turbine that produces rotary power from combustion gas generated by the gas turbine combustor.

Thus, the cover ring of the combustor nozzle is provided with the inclined flow passages, so that air jetted out of these inclined flow passages does not hinder the flow of air jetted out of the air flow passage. Accordingly, the cover ring is prevented from reaching a high temperature, and it is possible to improve the cooling performance of the leading end part while securing the combustion stability.

A cover ring of the present invention includes: an outer circumferential surface cover that has a cylindrical shape with a central axis; a leading end surface cover that has an annular shape inclined from a leading end part of the outer circumferential surface cover toward a central axis side and a leading end side; a through-hole that extends through the leading end surface cover in a thickness direction; and inclined flow passages that extend through the leading end surface cover in the thickness direction and are inclined in a predetermined direction relative to the central axis.

Thus, while a fluid jetted out of the through-hole flows toward the front side, a fluid jetted out of the inclined flow passages flows along a front surface of the leading end surface cover, so that the fluid jetted out of the through-hole is prevented from stagnating on the front surface of the leading end surface cover. When the fluid jetted out of the through-hole is a high-temperature fluid, the cover ring is prevented from reaching a high temperature and the cooling performance of the leading end part can be improved.

In the cover ring of the present invention, a plurality of through-holes are provided at predetermined intervals in a circumferential direction of the leading end surface cover, and more than one of the inclined flow passages are provided between the plurality of through-holes.

Thus, if the inclined flow passages are provided between the plurality of through-holes, the cooling performance of the leading end part can be improved.

In the cover ring of the present invention, the inclined flow passages are inclined along the circumferential direction of the leading end surface cover.

Thus, if the inclined flow passages are inclined along the circumferential direction of the leading end surface cover, air jetted out of these inclined flow passages flows in the circumferential direction along the front surface of the leading end surface cover, and the cover ring can be efficiently cooled with this jet of air.

In the cover ring of the present invention, the inclined flow passages are composed of a plurality of inclined flow passages having different inclination angles.

Thus, if the plurality of inclined flow passages having different inclination angles are provided, air jetted out of these inclined flow passages flows over a wide area of the front surface of the leading end surface cover, so that the cover ring can be efficiently cooled.

A combustor nozzle manufacturing method of the present invention includes a step of mounting a cover ring on an outer side of an outer circumference of a leading end of a nozzle body with a predetermined clearance thereto, the cover ring having an outer circumferential surface cover that has a cylindrical shape and covers an outer circumferential surface of the nozzle body, a leading end surface cover that has an annular shape and covers a leading end surface of the nozzle body, and inclined flow passages that extend through the leading end surface cover in a thickness direction and are inclined in a predetermined direction relative to a central axis direction of the nozzle body.

Thus, the cover ring provided with the inclined flow passages can be easily installed on the nozzle body, and it is possible to improve the cooling performance of the combustor nozzle as well as to improve the ease of installation.

Advantageous Effects of Invention

According to the combustor nozzle, the gas turbine combustor, the gas turbine, the cover ring, and the combustor nozzle manufacturing method of the present invention, the inclined flow passages that extend through the cover ring in the thickness direction and are inclined in a predetermined direction relative to the central axis direction are provided, so that it is possible to improve the cooling performance of the leading end part while securing the combustion stability.

BRIEF DESCRIPTION OF DRAWINGS

FIG. 35 is a schematic view showing the pilot nozzle manufacturing method.

DESCRIPTION OF EMBODIMENTS

A preferred embodiment of a combustor nozzle, a gas turbine combustor, a gas turbine, a cover ring, and a combustor nozzle manufacturing method according to the present invention will be described below in detail with reference to the accompanying drawings. However, the present invention is not limited by this embodiment, and if there are a plurality of embodiments, the invention also includes configurations combining these embodiments.

First Embodiment

Figure 7:
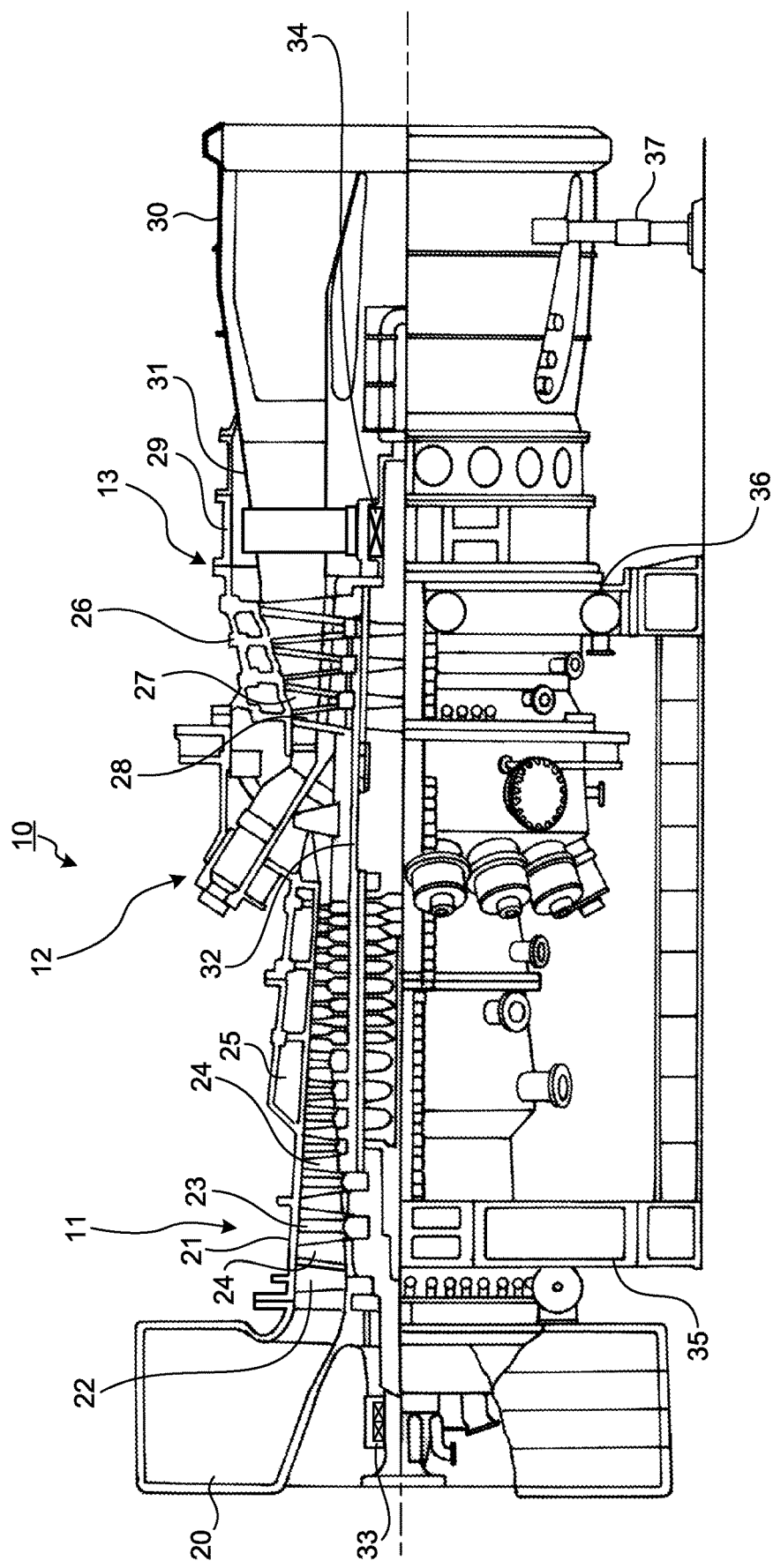
FIG. 7 is a schematic configurational view showing a gas turbine of the first embodiment.
Figure 8:
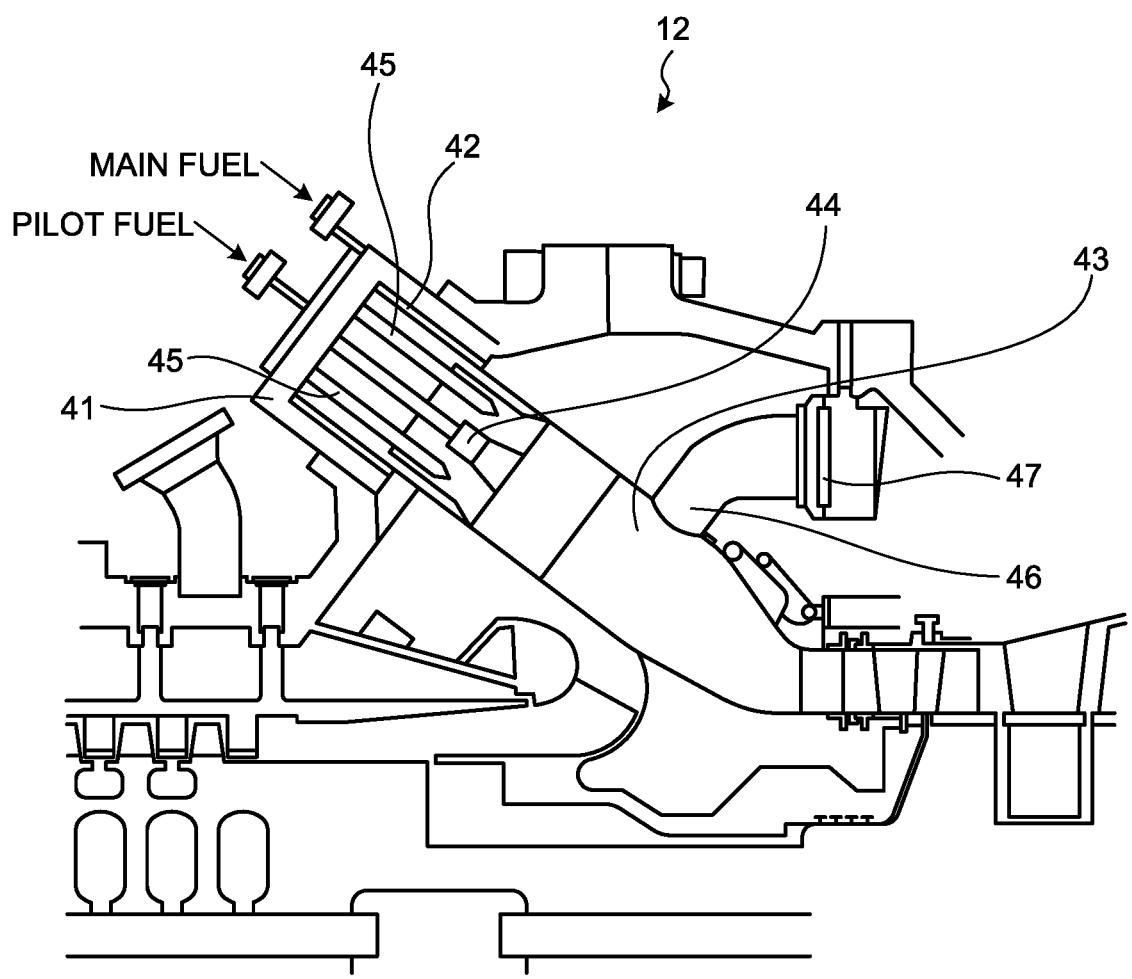
FIG. 8 is a schematic configurational view showing a gas turbine combustor of the first embodiment.
Figure 9:
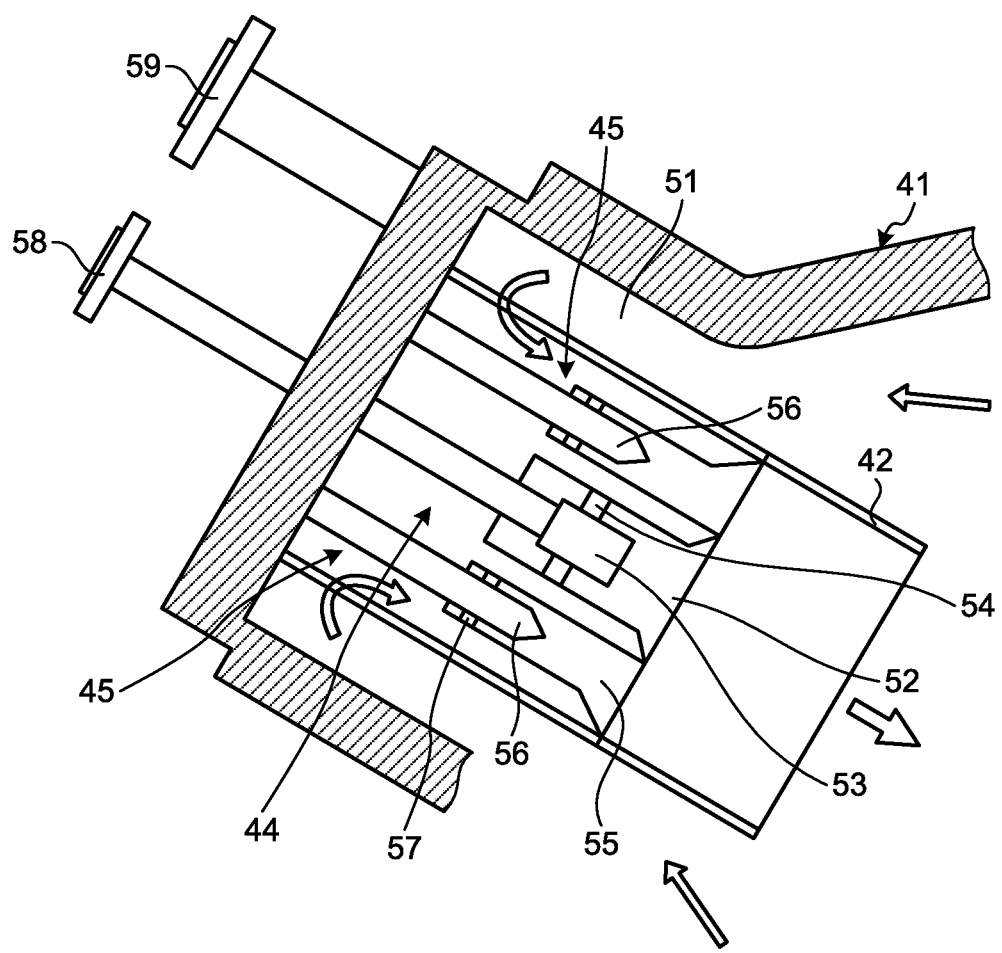
FIG. 9 is a sectional view of main parts of the gas turbine combustor of the first embodiment.

FIG. 7 is a schematic configurational view showing a gas turbine of a first embodiment; FIG. 8 is a schematic configurational view showing a gas turbine combustor of the first embodiment; and FIG. 9 is a sectional view of main parts of the gas turbine combustor of the first embodiment.

In the first embodiment, a gas turbine 10 is composed of a compressor 11, a combustor 12, and a turbine 13 as shown in FIG. 7. The gas turbine 10 can generate electric power with a generator (not shown) coaxially coupled thereto.

The compressor 11 has an air intake opening 20 through which air is taken in. Inside a compressor casing 21, an inlet guide vane (IGV) 22 is provided, and pluralities of vanes 23 and blades 24 are provided alternately in a front-rear direction (an axial direction of a rotor 32 to be described later), and an air bleed chamber 25 is provided on the outer side of the compressor casing 21. The combustor 12 supplies fuel to compressed air compressed in the compressor 11 and ignites this mixture to allow it to combust. The turbine 13 has pluralities of vanes 27 and blades 28 provided alternately in the front-rear direction (the axial direction of the rotor 32 to be described later) inside a turbine casing 26. An exhaust chamber 30 is provided on a downstream side of the turbine casing 26 with an exhaust casing 29 interposed therebetween, and the exhaust chamber 30 has an exhaust diffuser 31 that is continuous with the turbine 13.

The rotor (rotating shaft) 32 is located so as to extend through central parts of the compressor 11, the combustor 12, the turbine 13, and the exhaust chamber 30. One end of the rotor 32 on the side of the compressor 11 is rotatably supported by a bearing 33, while the other end thereof on the side of the exhaust chamber 30 is rotatably supported by a bearing 34. A stack of a plurality of discs each having the blades 24 mounted thereon is fixed to the rotor 32 inside the compressor 11, and a stack of a plurality of discs each having the blades 28 mounted thereon is fixed to the rotor 32 inside the turbine 13, and a drive shaft of the generator (not shown) is coupled to the end of the rotor 32 on the side of the exhaust chamber 30.

The gas turbine 10 has the compressor casing 21 of the compressor 11, the turbine casing 26 of the turbine 13, and the exhaust chamber 30 respectively supported by a leg 35, a leg 36, and a leg 37.

Thus, air taken in through the air intake opening 20 of the compressor 11 passes through the inlet guide vane 22 and the pluralities of vanes 23 and blades 24, and is thereby compressed into high-temperature, high-pressure compressed air. In the combustor 12, a predetermined fuel is supplied to this compressed air, and the air-fuel mixture is combusted. Then, high-temperature, high-pressure combustion gas that is a working fluid generated in the combustor 12 passes through the pluralities of vanes 27 and blades 28 of the turbine 13 and thereby drives the rotor 32 to rotate, which in turn drives the generator coupled to the rotor 32. Meanwhile, the combustion gas having driven the turbine 13 is released as exhaust gas into the atmosphere.

As shown in FIG. 8, in the combustor 12 described above, a combustor basket 42 is supported inside a combustor external cylinder 41 with a predetermined clearance thereto, and a combustor transition piece 43 is coupled to a leading end part of the combustor basket 42 to form a combustor casing. Inside the combustor basket 42, a pilot combustion burner 44 is disposed at the center, and a plurality of main combustion burners 45 are disposed on an inner circumferential surface of the combustor basket 42 so as to surround the pilot combustion burner 44 along a circumferential direction. A bypass pipe 46 is coupled to the combustor transition piece 43, and a bypass valve 47 is provided in the bypass pipe 46.

More specifically, as shown in FIG. 9, a base end part of the combustor basket 42 is mounted in a base end part of the combustor external cylinder 41, so that an air flow passage 51 is formed between the combustor basket 42 and the combustor external cylinder 41. Inside the combustor basket 42, the pilot combustion burner 44 is disposed at the center and the plurality of main combustion burners 45 are disposed around the pilot combustion burner 44.

The pilot combustion burner 44 is composed of a pilot cone 52 supported on the combustor basket 42, a pilot nozzle 53 disposed inside the pilot cone 52, and a swirler (swirler vane) 54 provided on an outer circumference of the pilot nozzle 53. Each main combustion burner 45 is composed of a burner cylinder 55, a main nozzle 56 disposed inside the burner cylinder 55, and a swirler (swirler vane) 57 provided on an outer circumference of the main nozzle 56.

In the combustor external cylinder 41, a pilot fuel line and a main combustion line (neither is shown) are respectively coupled to a fuel port 58 of the pilot nozzle 53 and a fuel port 59 of the main nozzles 56.

Thus, when an air current of the high-temperature, high-pressure compressed air flows into the air flow passage 51, this compressed air flows into the combustor basket 42. Inside the combustor basket 42, the compressed air is mixed with fuel injected from the main combustion burner 45 and forms a swirling current of an air-fuel premixture. Moreover, the compressed air is mixed with fuel injected from the pilot combustion burner 44, ignited with a pilot flame (not shown) and combusted, and then jetted out as combustion gas into the combustor basket 42. Here, part of the combustion gas is jetted out along with a flame into the combustor basket 42 so as to diffuse to a surrounding area, which causes the air-fuel premixture having flowed from each main combustion burner 45 into the combustor basket 42 to be ignited and combusted. Thus, this diffusion flame formed by the pilot fuel injected from the pilot combustion burner 44 can hold the flame of the lean air-fuel premixture from the main combustion burners 45 for stable combustion.

Figure 1:
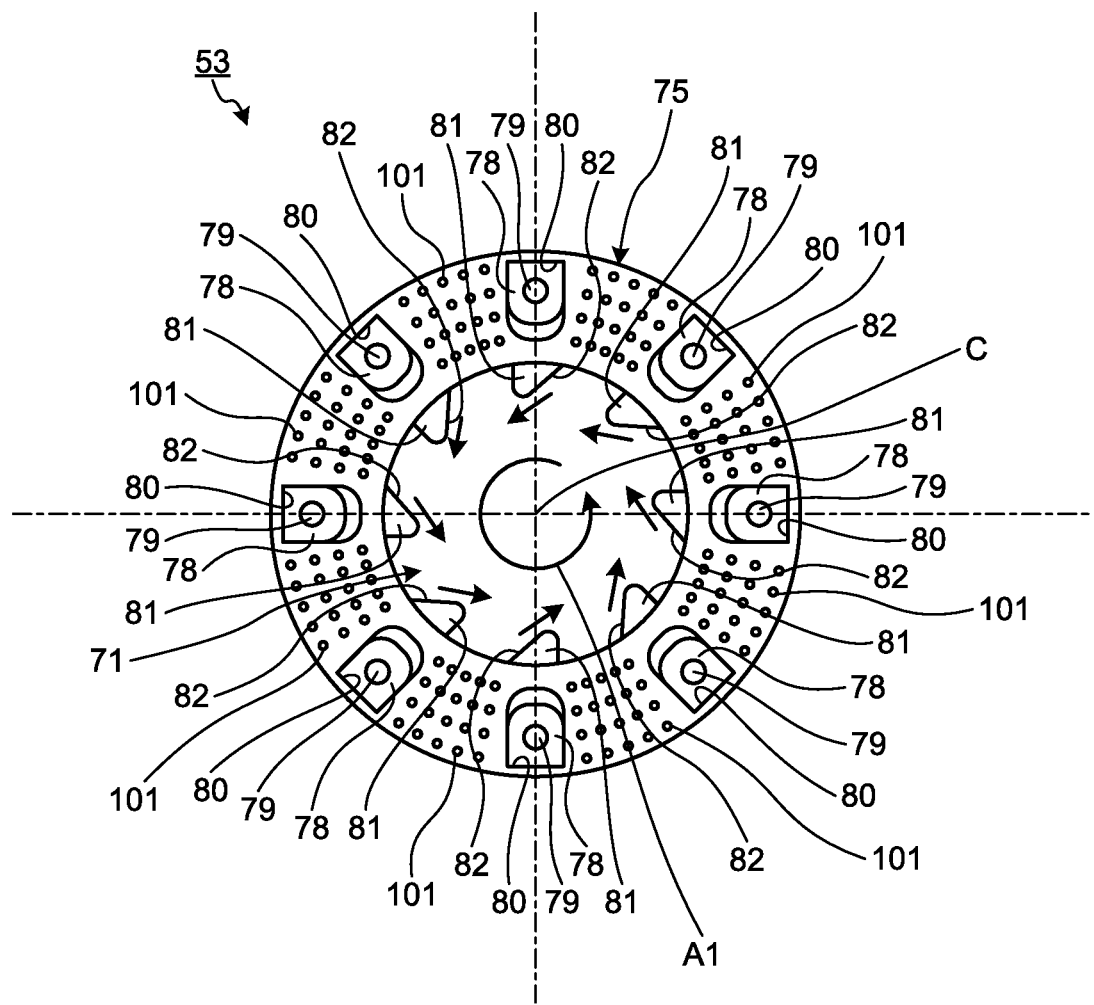
FIG. 1 is a front view showing a leading end part of a pilot nozzle of a first embodiment.
Figure 2:
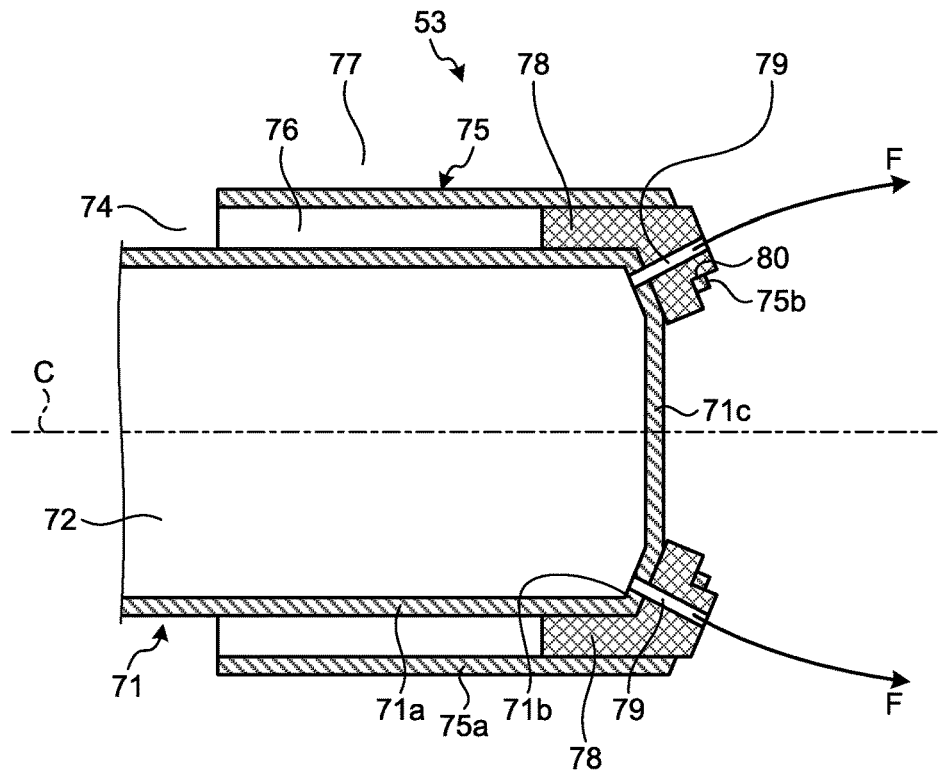
FIG. 2 is a sectional view of the leading end part of the pilot nozzle cut at a position where nozzle tips are present.

Now, the pilot nozzle 53 of the first embodiment will be described in detail. FIG. 1 is a front view showing a leading end part of the pilot nozzle of the first embodiment; FIG. 2 is a sectional view of the leading end part of the pilot nozzle cut at a position where nozzle tips are present; and FIG. 3 is a sectional view of the leading end part of the pilot nozzle cut at a position where no nozzle tip is present.

Figure 3:
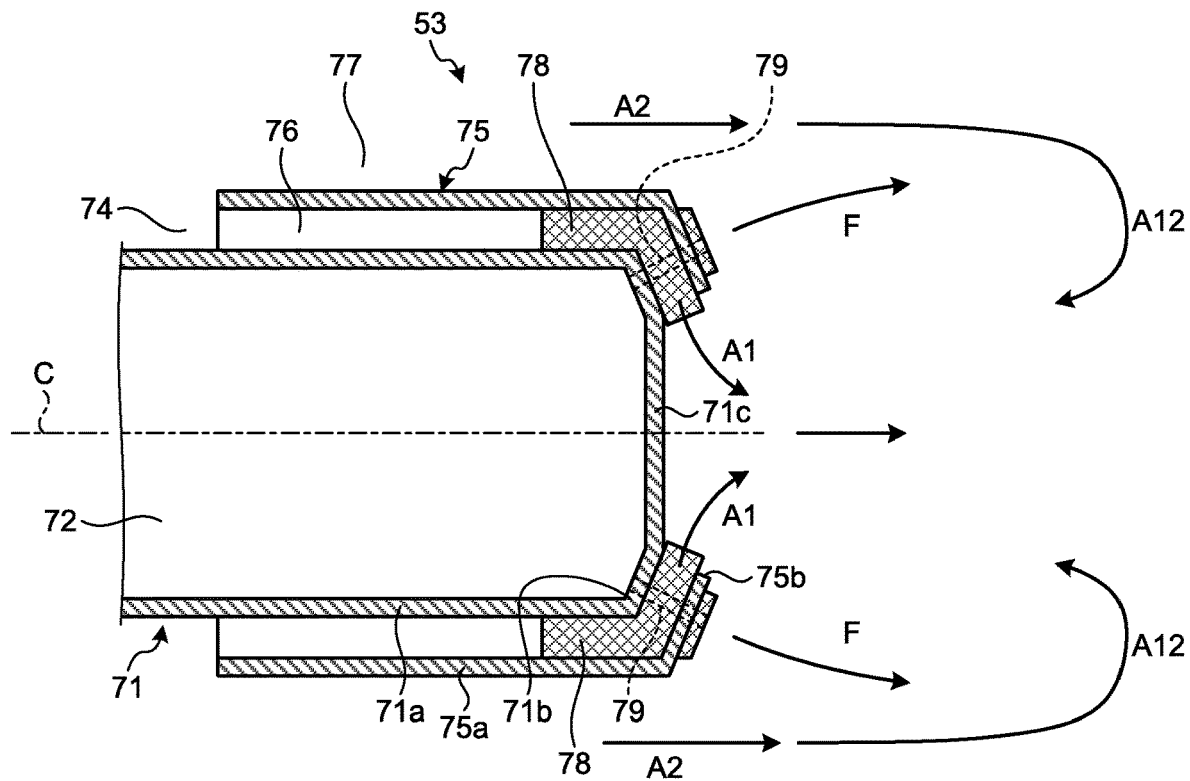
FIG. 3 is a sectional view of the leading end part of the pilot nozzle cut at a position where no nozzle tip is present.

As shown in FIG. 1 to FIG. 3, the nozzle body 71 of the pilot nozzle 53 has a hollow cylindrical shape and extends in a rod shape, and is disposed along a central axis C of the pilot nozzle 53. A fuel flow passage 72 is provided inside the nozzle body 71. With a base end part communicating with the fuel port 58 (see FIG. 9), the fuel flow passage 72 allows the air-fuel mixture (pilot fuel), which is a mixture of the fuel and the compressed air, to flow toward the leading end side.

An air flow passage 74 is provided on the outer side of the nozzle body 71. With a base end part communicating with the air flow passage 51, the air flow passage 74 allows the air that has been compressed (compressed air) to flow toward the leading end part side. A cover ring 75 is disposed on the leading end part side of the nozzle body 71. The cover ring 75 has a cylindrical shape and is disposed on the outer side of the nozzle body 71 with a predetermined clearance thereto, and a leading end part of the cover ring 75 is bent toward the inner side (toward the central axis C).

Specifically, the nozzle body 71 is composed of a cylindrical part 71a, a conical part 71b that is bent from a leading end of the cylindrical part 71a toward the inner side (toward the central axis C) so as to form a conical shape, and a disc part 71c that closes a leading end of the conical part 71b. The leading end of the conical part 71b has an inclined shape toward the side of the central axis C and the leading end side, and the disc part 71c has a flat plate shape orthogonal to the central axis C. The cover ring 75 has an outer circumferential surface cover 75a located on the outer side of the nozzle body 71, and a leading end surface cover 75b inclined from a leading end part of the outer circumferential surface cover 75a toward the side of the central axis C and the leading end part side. A plurality of inner spacers (not shown) are interposed between the nozzle body 71 and the cover ring 75 at predetermined intervals in the circumferential direction, so that a predetermined clearance is secured between the nozzle body 71 and the cover ring 75. Thus, the leading end part of the air flow passage 74 provided on the outer side of the nozzle body 71 is divided by the cover ring 75 into an inner air flow passage 76 and an outer air flow passage 77.

The nozzle body 71 has a plurality of nozzle tips 78 fixed to a surface of the disc part 71c on the leading end part side at predetermined intervals (regular intervals) in the circumferential direction. Fuel injection nozzles 79 are provided so as to extend respectively through the nozzle tips 78. Each fuel injection nozzle 79 is inclined at a predetermined angle relative to the central axis C so that a leading end part thereof is directed toward the outer side. A base end part of each fuel injection nozzle 79 communicates with the fuel flow passage 72, while the leading end part thereof is open to the outside. A plurality of through-holes 80 are formed in the leading end surface cover 75b of the cover ring 75 at predetermined intervals (regular intervals) in the circumferential direction, and leading end parts of the nozzle tips 78 are respectively fitted in the through-holes 80.

Thus, the cover ring 75 is disposed on the outer side of the outer circumference of the leading end of the nozzle body 71 with a predetermined clearance thereto, so that the inner air flow passage 76 is formed between the nozzle body 71 and the cover ring 75. With the leading end part bent toward the central axis C, the inner air flow passage 76 can jet out air (air current A1) toward the front side of the nozzle body 71 and toward the central axis C. The fuel (air-fuel mixture F) can be injected toward the outer side of the air current A1 by the plurality of nozzle tips 78 and the fuel injection nozzles 79, communicating with the fuel flow passage 72, mounted in the leading end part of the nozzle body 71 at predetermined intervals in the circumferential direction. Moreover, a sleeve (not shown) is disposed on the outer side of the outer circumference of the cover ring 75 with a predetermined clearance thereto, so that the outer air flow passage 77 is formed between the cover ring 75 and the sleeve, and air can be jetted out (air current A2) through the outer air flow passage 77 toward the outer side of the air-fuel mixture F.

The pilot nozzle 53 is further provided with swirling force application parts that apply a swirling force to the air flowing through the inner air flow passage 76. Specifically, the plurality of nozzle tips 78 are each provided with a guide part 81 that protrudes toward the central axis C and serves as the swirling force application part, and a guide surface 82 that guides the air flowing through the inner air flow passage 76 is formed on one side in the circumferential direction of the guide part 81.

Thus, the pilot nozzle 53 can apply to the air a swirling force in the clockwise direction as seen from the front side by means of the swirler 54 (see FIG. 9), and at the same time can apply to the air a swirling force in the counterclockwise direction as seen from the front side by means of the guide surfaces 82 of the guide parts 81.

As the pilot nozzle 53 is disposed at a central part of the combustor 12, a high-temperature flame is formed in the vicinity of the leading end part of the pilot nozzle 53, and the leading end part is heated by this flame to a high temperature. While the plurality of nozzle tips 78 are protected by being covered with the cover ring 75, the cover ring 75 itself reaches a high temperature. In this embodiment, therefore, a plurality of inclined flow passages 101 are provided in the cover ring 75, and part of the air flowing through the inner air flow passage 76 is jetted out of the inclined flow passages 101 through the surface of the cover ring 75 to thereby cool the cover ring 75.

Figure 4:
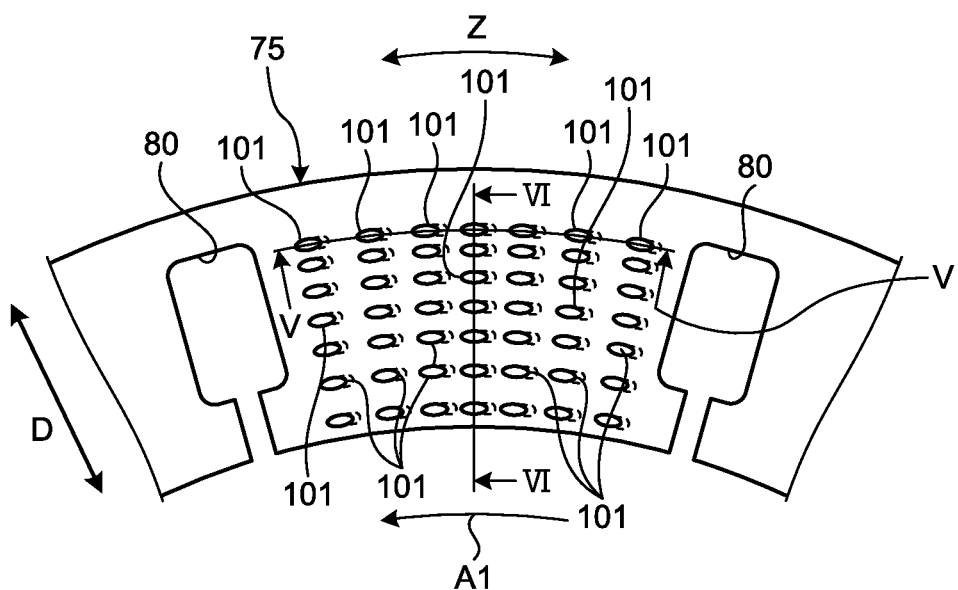
FIG. 4 is an enlarged front view of a part of a cover ring.
Figure 5:
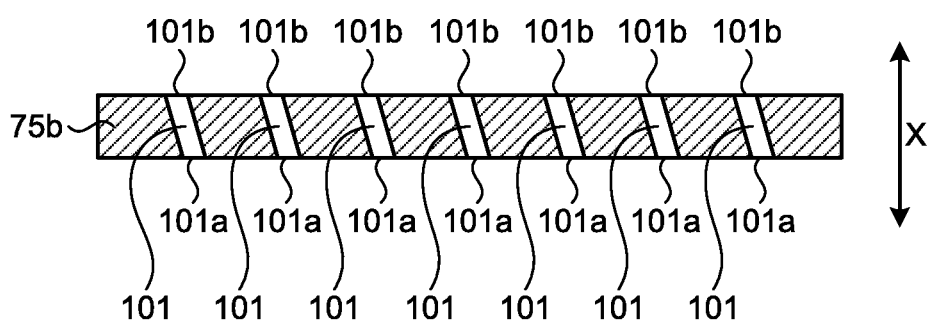
FIG. 5 is a sectional view taken along the line V-V of FIG. 4.

FIG. 4 is an enlarged front view of a part of the cover ring; FIG. 5 is a sectional view taken along the line V-V of FIG. 4; and FIG. 6 is a sectional view taken along the line VI-VI of FIG. 4.

Figure 6:
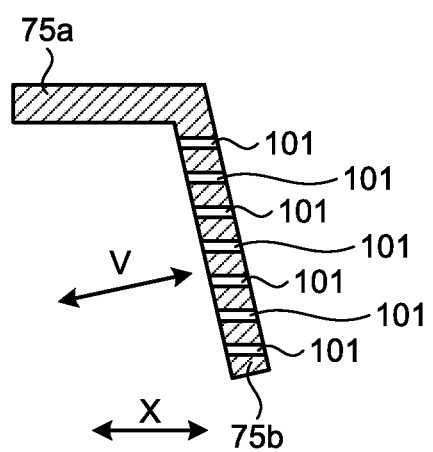
FIG. 6 is a sectional view taken along the line VI-VI of FIG. 4.

As shown in FIG. 4 to FIG. 6, the cover ring 75 is composed of the outer circumferential surface cover 75a and the leading end surface cover 75b. The outer circumferential surface cover 75a has a cylindrical shape, and the leading end surface cover 75b is integrally provided on the leading end part in the central axis direction. The leading end surface cover 75b has an annular shape inclined from the leading end part of the outer circumferential surface cover 75a toward the side of the central axis C and toward the leading end part side in the central axis direction. As shown in FIG. 3, the outer circumferential surface cover 75a covers the outer circumferential surface of the nozzle body 71, and the leading end surface cover 75b covers the leading end surface of the nozzle body 71.

Referring back to FIG. 4 to FIG. 6, the cover ring 75 is provided with the plurality of inclined flow passages 101 that extend through the leading end surface cover 75b in a thickness direction and are inclined in a predetermined direction relative to a central axis direction X. The plurality of inclined flow passages 101 are arrayed between the adjacent through-holes 80 in a circumferential direction Z and a radial direction D so as to form a lattice pattern, but the inclined flow passages 101 may instead be arrayed in a staggered pattern. In addition, the plurality of inclined flow passages 101 are arrayed radially (along the radial direction D) from the central axis C (see FIG. 1).

The plurality of inclined flow passages 101 are inclined along the circumferential direction Z of the cover ring 75. In this case, air passing through the inner air flow passage 76 and jetted out toward the front side is the air current A1 that is swirled in the counterclockwise direction by the guide surfaces 82 of the guide parts 81 (see FIG. 1), and therefore the plurality of inclined flow passages 101 are inclined along the swirling direction of the air current A1.

Specifically, the inclined flow passages 101 are through-holes having a circular cross-section and extending through the leading end surface cover 75b of the cover ring 75 in the plate thickness direction. An outlet 101b of each inclined flow passage 101 that is open in the front surface of the leading end surface cover 75b is located on the downstream side of the swirling air current A1 relative to an inlet 101a thereof that is open in a rear surface of the leading end surface cover 75b, and each inclined flow passage 101 is a straight linear hole that provides communication between the inlet 101a and the outlet 101b. The inclined flow passages 101 are inclined in the circumferential direction Z relative to the central axis direction X, and are also inclined relative to a direction V perpendicular to the front surface of the leading end surface cover 75b.

Now, effects of the pilot nozzle 53 and the combustor 12 of the first embodiment will be described.

As shown in FIG. 1 to FIG. 3 and FIG. 9, in the pilot nozzle 53, the air-fuel mixture (fuel) F injected from the fuel injection nozzles 79 is ignited with a pilot flame (not shown) and combusted, and is jetted out as high-temperature combustion gas along with a flame so as to diffuse to a surrounding area. Meanwhile, air flowing through the air flow passage 74 is divided by the cover ring 75 into air passing through the inner air flow passage 76 and air passing through the outer air flow passage 77. The air inside the inner air flow passage 76 is guided to the inner side of the cover ring 75, is deflected by the leading end surface cover 75b toward the inner side and proceeds, and is injected as the air current A1 toward the front side of the nozzle body 71 and toward the inner side of the air-fuel mixture F. At this point, the air current A1 jetted out of the inner air flow passage 76 is turned by the guide surfaces 82, provided on the nozzle tips 78, into a swirling current around the central axis C of the nozzle body 71. On the other hand, the air in the outer air flow passage 77 is guided to the outer side of the cover ring 75, and is jetted out as an air current A2 from the outer side of the nozzle body 71 toward the front side and toward the outer side of the air-fuel mixture F.

Meanwhile, as shown in FIG. 9, in the combustor 12, the air-fuel premixture of the fuel and the compressed air injected from the main nozzles 56 is turned by the swirler 57 into a swirling current, so that the air-fuel premixture recirculates inside the combustor basket 42 along with the air current A2 from the outer circumferential side toward the central axis C, and thus forms a circulating current A12 and flows into the leading end part of the pilot nozzle 53. The air current A1 that has been jetted out of the pilot nozzle 53 and turned into the swirling current flows along the central axis C while swirling in one direction.

Here, part of the air inside the inner air flow passage 76 is jetted out toward the front side from the plurality of inclined flow passages 101 provided in the leading end surface cover 75b of the cover ring 75. Then, the air jetted out of the plurality of inclined flow passages 101 becomes film air that flows over the front surface of the leading end surface cover 75b along the circumferential direction, and keeps the flame at a distance toward the front side. This prevents the front surface of the cover ring 75 from reaching a high temperature. Moreover, the air jetted out of the inclined flow passages 101 flows along the front surface of the leading end surface cover 75b of the cover ring 75, and thus keeps the formed flame at not too long a distance but holds the flame at an optimal position. Thus, it is possible to cool the cover ring 75 as well as to secure the combustion stability.

Thus, the pilot nozzle of the first embodiment includes the nozzle body 71 provided with the fuel flow passage 72, the cover ring 75 that is disposed on the outer side of the nozzle body 71 so as to form the air flow passages 76, 77 that allow air to jet out toward the front side, and the fuel injection nozzles 79 that are provided in the leading end part of the nozzle body 71 at predetermined intervals in the circumferential direction so as to be able to inject the fuel from the fuel flow passage 72 toward the front side. The cover ring 75 has the outer circumferential surface cover 75a that covers the outer circumferential surface of the nozzle body 71, the leading end surface cover 75b that covers the leading end surface of the nozzle body 71, and the plurality of inclined flow passages 101 that extend through the leading end surface cover 75b in the thickness direction and are inclined in a predetermined direction relative to the direction of the central axis C.

Accordingly, part of the air flowing through the inner air flow passage 76 is jetted out of the inclined flow passages 101 of the leading end surface cover 75b, and this jet of air flows along the front surface of the leading end surface cover 75b and thereby keeps the flame at an appropriate distance. As a result, the cover ring 75 is prevented from reaching a high temperature, and it is possible to improve the cooling performance of the leading end part while securing the combustion stability.

In the pilot nozzle of the first embodiment, the inclined flow passages 101 are inclined along the circumferential direction of the cover ring 75. Thus, the air jetted out of the inclined flow passages 101 flows along the front surface of the leading end surface cover 75b in the circumferential direction, so that the cover ring 75 can be efficiently cooled with this jet of air.

The pilot nozzle of the first embodiment is provided with the guide parts 81 as the swirling force application parts that apply a swirling force to the air current flowing through the inner air flow passage 76, and the guide surface 82 is formed on one side in the circumferential direction of each guide part 81. Accordingly, the air jetted out of the inclined flow passages 101 flows over the front surface of the leading end surface cover 75b along the air swirling direction. Thus, the air from the inclined flow passages 101 does not adversely affect the swirling air, and it is possible to efficiently cool the cover ring 75 while securing the combustion stability.

In the pilot nozzle of the first embodiment, the inclined flow passages 101 are inclined in the circumferential direction Z relative to the central axis direction X, and are also inclined relative to the direction V perpendicular to the front surface of the leading end surface cover 75b. Thus, the air jetted out of the inclined flow passages 101 can flow efficiently along the front surface of the leading end surface cover 75b.

In the pilot nozzle of the first embodiment, the inclined flow passages 101 are through-holes that extend through the cover ring 75 in the plate thickness direction. Thus, the structure of the pilot nozzle can be simplified and the ease of manufacturing thereof can be improved.

The gas turbine combustor of the first embodiment is provided with the pilot combustion burner 44 disposed at the central part inside the combustor basket 42, and the plurality of main combustion burners 45 disposed so as to surround the pilot combustion burner 44 inside the combustor basket 42, and the pilot combustion burner 44 is provided with the pilot nozzle 53 described above. Thus, the cover ring 75 of the pilot nozzle 53 is provided with the inclined flow passages 101, so that the cover ring 75 is prevented from reaching a high temperature, and it is possible to improve the cooling performance of the leading end part while securing the combustion stability.

The gas turbine of the first embodiment is provided with the compressor 11, the combustor 12, and the turbine 13. Thus, the cover ring 75 is prevented from reaching a high temperature, and it is possible to improve the cooling performance of the leading end part while securing the combustion stability.

The cover ring of the first embodiment has the outer circumferential surface cover 75a that has a cylindrical shape with the central axis C, the leading end surface cover 75b that has an annular shape inclined from the leading end part of the outer circumferential surface cover 75a toward the side of the central axis C and the leading end side, the through-holes 80 extending through the leading end surface cover 75b in the thickness direction, and the inclined flow passages 101 that extend through the leading end surface cover 75b in the thickness direction and are inclined in a predetermined direction relative to the central axis C.

Thus, while the fuel (fluid) jetted out of the fuel injection nozzles 79 of the nozzle tips 78 fitted in the through-holes 80 flows toward the front side and forms a flame, the air (fluid) jetted out of the inclined flow passages 101 flows along the front surface of the leading end surface cover 75b, and this jet of air keeps the flame at an appropriate distance by flowing along the front surface of the leading end surface cover 75b. As a result, the cover ring 75 is prevented from reaching a high temperature, and it is possible to improve the cooling performance of the leading end part while securing the combustion stability.

In the cover ring of the first embodiment, the plurality of through-holes 80 are provided at predetermined intervals in the circumferential direction of the leading end surface cover 75b, and more than one of the inclined flow passages 101 are provided between the plurality of through-holes 80. Thus, the cooling performance of the leading end surface cover 75b can be improved.

Figure 10:
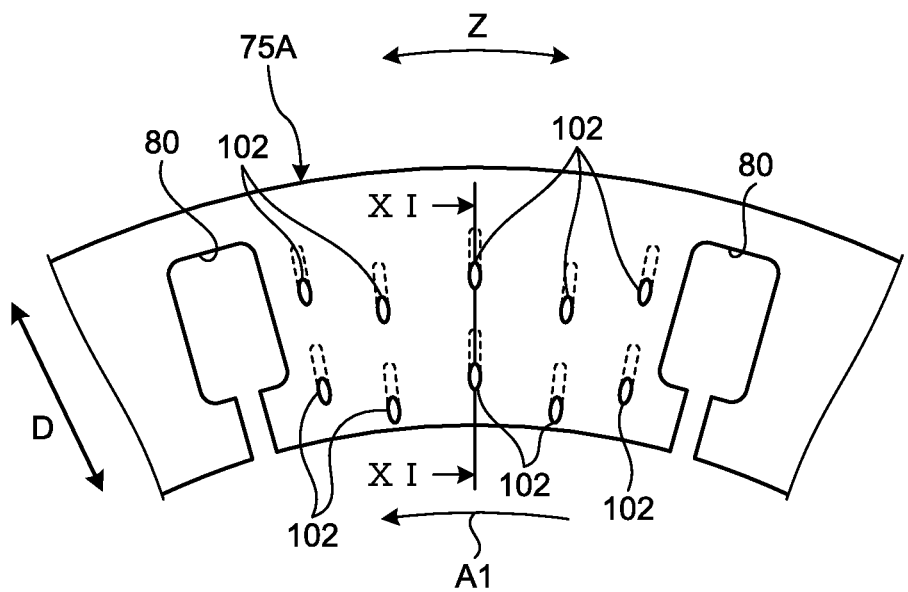
FIG. 10 is an enlarged front view of a part of a cover ring of Modified Example 1 of the first embodiment.

In the above embodiment, the plurality of inclined flow passages 101 that are inclined in the circumferential direction Z relative to the central axis direction X are provided in the leading end surface cover 75b of the cover ring 75, but the first embodiment is not limited to this configuration. FIG. 10 is an enlarged front view of a part of a cover ring of Modified Example 1 of the first embodiment, and FIG. 11 is a sectional view taken along the line XI-XI of FIG. 10.

Figure 11:
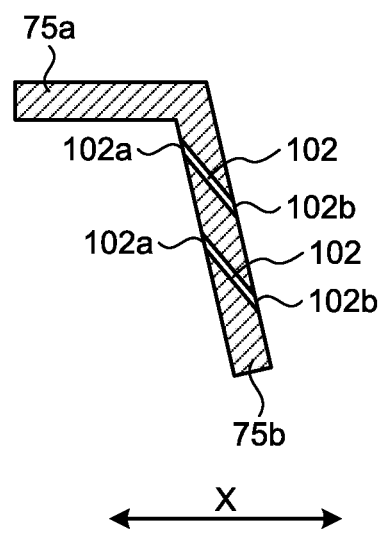
FIG. 11 is a sectional view taken along the line XI-XI of FIG. 10.

In Modified Example 1 of the first embodiment, as shown in FIG. 10 and FIG. 11, a cover ring 75A is provided with a plurality of inclined flow passages 102 that extend through the leading end surface cover 75b in the thickness direction and are inclined in a predetermined direction relative to the central axis direction X. The plurality of inclined flow passages 102 are arrayed between the adjacent through-holes 80 in the circumferential direction Z and the radial direction D so as to form a staggered pattern. In addition, the plurality of inclined flow passages 102 are arrayed radially (along the radial direction D) from the central axis C (see FIG. 1).

The plurality of inclined flow passages 102 are inclined along the radial direction D of the cover ring 75A and are inclined so as to face the central axis C (see FIG. 1). In this case, the air passing through the inner air flow passage 76 and jetted out toward the front side is the air current A1 that is jetted out along the radial direction D of the cover ring 75A and then swirled in the counterclockwise direction by the guide surfaces 82 of the guide parts 81 (see FIG. 1), and therefore the plurality of inclined flow passages 102 are inclined so as to face the direction in which this air is jetted out.

Specifically, the inclined flow passages 102 are through-holes having a circular cross-section and extending through the leading end surface cover 75b of the cover ring 75A in the plate thickness direction. An outlet 102b of each inclined flow passage 102 that is open in the front surface of the leading end surface cover 75b is located on the side of the central axis C in the radial direction D relative to an inlet 102a thereof that is open in the rear surface of the leading end surface cover 75b, and each inclined flow passage 102 is a straight linear hole that provides communication between the inlet 102a and the outlet 102b.

In Modified Example 1 of the first embodiment, the inclined flow passages 102 extend along the radial direction D of the cover ring 75A and are inclined so as to face the central axis C. Thus, air jetted out of the inclined flow passages 102 cools the front surface of the leading end surface cover 75b, and then this air appropriately merges with the air jetted out of the inner air flow passage 76, so that the combustion stability can be secured.

Figure 12:
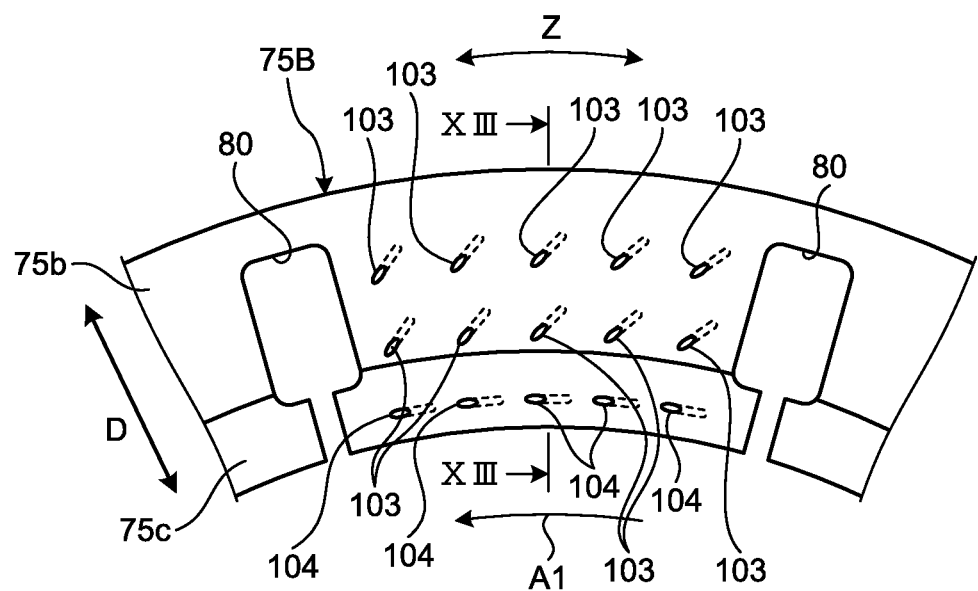
FIG. 12 is an enlarged front view of a cover ring of Modified Example 2 of the first embodiment.
Figure 13:
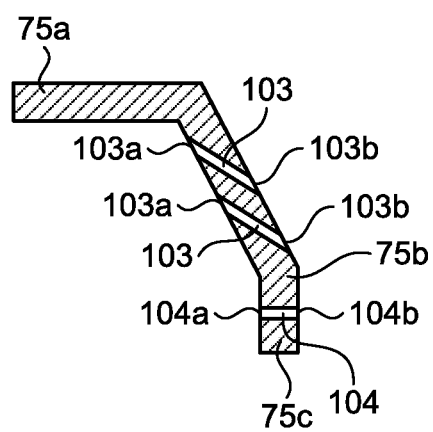
FIG. 13 is a sectional view taken along the line XIII-XIII of FIG. 12.

FIG. 12 is an enlarged front view of a part of a cover ring of Modified Example 2 of the first embodiment, and FIG. 13 is a sectional view taken along the line XIII-XIII of FIG. 12.

In Modified Example 2 of the first embodiment, as shown in FIG. 12 and FIG. 13, a cover ring 75B is provided with pluralities of inclined flow passages 103, 104 that extend through the leading end surface cover 75b in the thickness direction and are inclined in predetermined directions relative to the central axis direction X. The pluralities of inclined flow passages 103, 104 are arrayed between the adjacent through-holes 80 in the circumferential direction Z and the radial direction D so as to form a lattice pattern. In addition, the pluralities of inclined flow passages 103, 104 are arrayed radially (along the radial direction D) from the central axis C (see FIG. 1).

The cover ring 75B has the outer circumferential surface cover 75a, a first leading end surface cover 75b that is inclined from the leading end part of the outer circumferential surface cover 75a at a predetermined angle relative to the radial direction D, and a second leading end surface cover 75c that extends along the radial direction D from a leading end part of the first leading end surface cover 75b. Thus, in the cover ring 75B, an inclined first front surface of the first leading end surface cover 75b and a horizontal second front surface extending along the radial direction of the second leading end surface cover 75c are set to different angles. The plurality of inclined flow passages 103 are provided in the first leading end surface cover 75b, and are inclined along a direction that is inclined at a predetermined angle (e.g., 45 degrees) relative to the radial direction D and the circumferential direction Z of the cover ring 75B. The plurality of inclined flow passages 104 are provided in the second leading end surface cover 75c, and are inclined along the circumferential direction Z of the cover ring 75B.

Specifically, the inclined flow passages 103, 104 are through-holes having a circular cross-section and extending through the leading end surface covers 75b, 75c of the cover ring 75B in the plate thickness direction. Outlets 103b, 104b of the inclined flow passages 103, 104 that are open in the front surfaces of the leading end surface covers 75b, 75c are located on the downstream side of the swirling air current A1 relative to inlets 103a, 104a thereof that are open in the rear surfaces of the leading end surface covers 75b, 75c, and the inclined flow passages 103, 104 are straight linear holes that provide communication between the inlets 103a, 104a and the outlets 103b, 104b.

In Modified Example 2 of the first embodiment, the inclination direction of the inclined flow passages 103 provided in the first leading end surface cover 75b and the inclination direction of the inclined flow passages 104 provided in the second leading end surface cover 75c are different from each other. Thus, air jetted out of the inclined flow passages 103, 104 flows over a wide area of the front surface of the leading end surface cover 75b, so that the cover ring 75B can be efficiently cooled.

Alternatively, the inclined flow passages 104 may be provided in the first leading end surface cover 75b, and the inclined flow passages 103 may be provided in the second leading end surface cover 75c.

Figure 14:
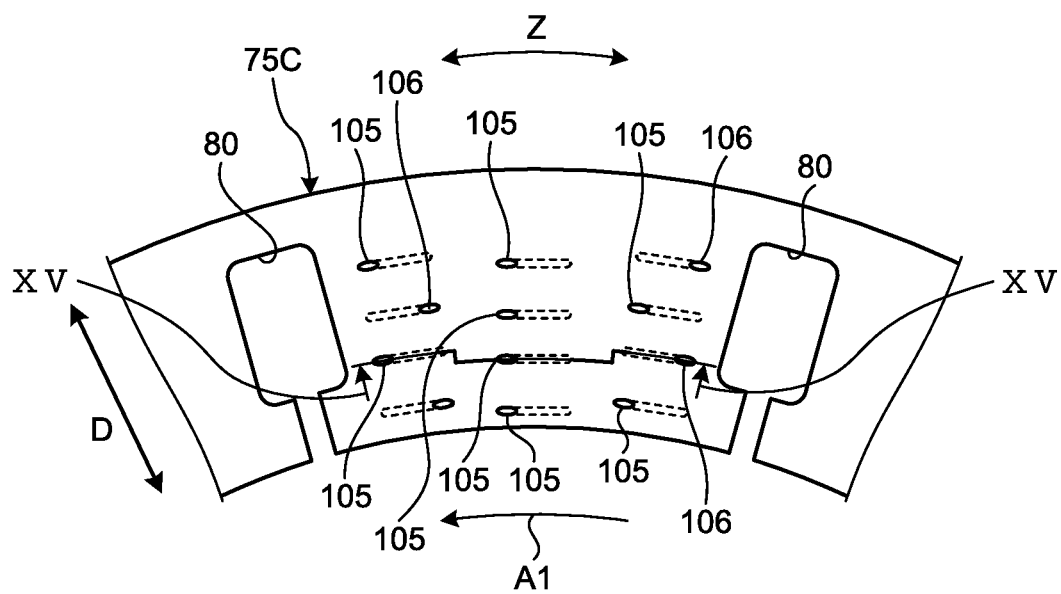
FIG. 14 is an enlarged front view of a part of a cover ring of Modified Example 3 of the first embodiment.
Figure 15:
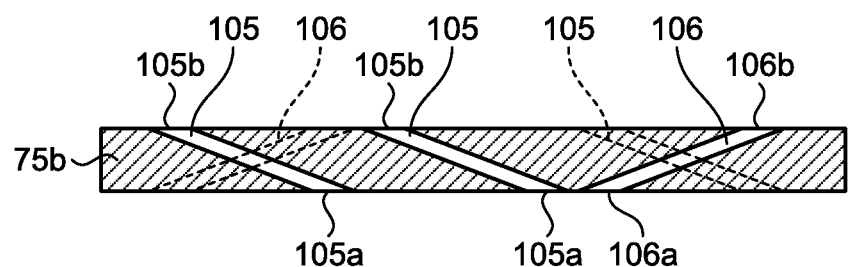
FIG. 15 is a sectional view taken along the line XV-XV of FIG. 14.

FIG. 14 is an enlarged front view of a part of a cover ring of Modified Example 3 of the first embodiment. FIG. 15 is a sectional view taken along the line XV-XV of FIG. 14.

In Modified Example 3 of the first embodiment, as shown in FIG. 14 and FIG. 15, a cover ring 75C is provided with pluralities of inclined flow passages 105, 106 that extend through the leading end surface cover 75b in the thickness direction and are inclined in predetermined directions relative to the central axis direction X. The pluralities of inclined flow passages 105, 106 are arrayed between the adjacent through-holes 80 in the circumferential direction Z and the radial direction D so as to form a staggered pattern. In addition, the pluralities of inclined flow passages 105, 106 are arrayed radially (along the radial direction D) from the central axis C (see FIG. 1).

The pluralities of inclined flow passages 105, 106 are provided in the leading end surface cover 75b and are inclined along the circumferential direction Z of the cover ring 75C. The plurality of inclined flow passages 105 are inclined so as to face the downstream side in the flow direction of the air current A1 swirling in the counterclockwise direction, while the plurality of inclined flow passages 106 are inclined so as to face the upstream side in the flow direction of the air current A1.

Specifically, the inclined flow passages 105, 106 are through-holes having a circular cross-section and extending through the leading end surface cover 75b of the cover ring 75C in the plate thickness direction. An outlet 105b of each inclined flow passage 105 that is open in the front surface of the leading end surface cover 75b is located on the downstream side of the swirling air current A1 relative to an inlet 105a thereof that is open in the rear surface of the leading end surface cover 75b, and each inclined flow passage 105 is a straight linear hole that provides communication between the inlet 105a and the outlet 105b. An outlet 106b of each inclined flow passage 106 that is open in the front surface of the leading end surface cover 75b is located on the upstream side of the swirling air current A1 relative to an inlet 106a thereof that is open in the rear surface of the leading end surface cover 75b, and each inclined flow passage 106 is a straight linear hole that provides communication between the inlet 106a and the outlet 106b.

In Modified Example 3 of the first embodiment, the two types of inclined flow passages 105, 106 are provided so that the inclination directions intersect with each other. Thus, air jetted out of the inclined flow passages 105, 106 flows over a wide area of the front surface of the leading end surface cover 75b, so that the cover ring 75C can be efficiently cooled.

Figure 16:
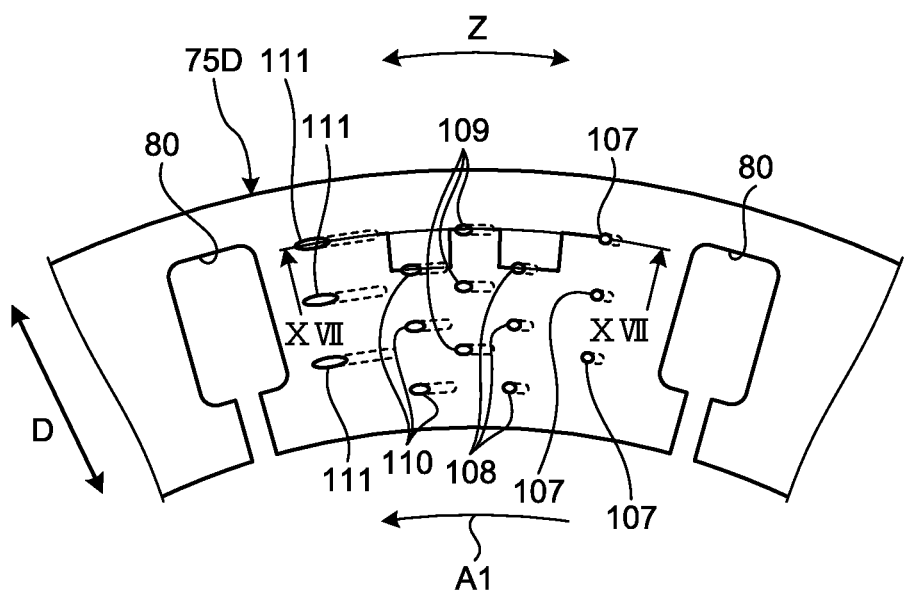
FIG. 16 is an enlarged front view of a part of a cover ring of Modified Example 4 of the first embodiment
Figure 17:
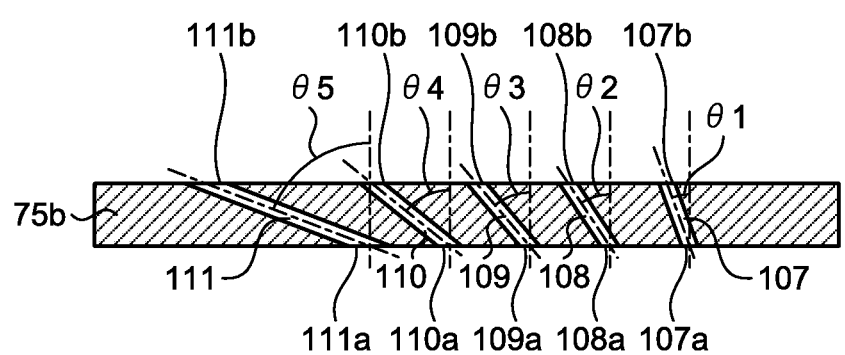
FIG. 17 is a sectional view taken along the line XVII-XVII of FIG. 16.

FIG. 16 is an enlarged front view of a part of a cover ring of Modified Example 4 of the first embodiment, and FIG. 17 is a sectional view taken along the line XVII-XVII of FIG. 16.

In Modified Example 4 of the first embodiment, as shown in FIG. 16 and FIG. 17, a cover ring 75D is provided with pluralities of inclined flow passages 107, 108, 109, 110, 111 that extend through the leading end surface cover 75b in the thickness direction and are inclined in predetermined directions relative to the central axis direction X. The pluralities of inclined flow passages 107, 108, 109, 110, 111 are arrayed between the adjacent through-holes 80 in the circumferential direction Z and the radial direction D so as to form a staggered pattern. In addition, the pluralities of inclined flow passages 107, 108, 109, 110, 111 are arrayed radially (along the radial direction D) from the central axis C (see FIG. 1).

The pluralities of inclined flow passages 107, 108, 109, 110, 111 are provided in the leading end surface cover 75b, and are inclined along the circumferential direction Z of the cover ring 75D. The pluralities of inclined flow passages 107, 108, 109, 110, 111 are inclined so as to face the downstream side in the flow direction of the air current A1 swirling in the counterclockwise direction. The inclination angles of the pluralities of inclined flow passages 107, 108, 109, 110, 111 are different from one another, and are set so that the inclination angles relative to the central axis C become larger toward the downstream side in the flow direction of the swirling air current A1.

Specifically, the pluralities of inclined flow passages 107, 108, 109, 110, 111 are through-holes having a circular cross-section and extending through the leading end surface cover 75b of the cover ring 75D in the plate thickness direction. Outlets 107b, 108b, 109b, 110b, 111b of the inclined flow passages 107, 108, 109, 110, 111 that are open in the front surface of the leading end surface cover 75b are located on the downstream side of the swirling air current A1 relative to inlets 107a, 108a, 109a, 110a, 111a thereof that are open in the rear surface of the leading end surface cover 75b, and the inclined flow passages 107, 108, 109, 110, 111 are straight linear holes that provide communication between the inlets 107a, 108a, 109a, 110a, 111a and the outlets 107b, 108b, 109b, 110b, 111b. Inclination angles $\theta 1$, $\theta 2$, $\theta 3$, $\theta 4$, $\theta 5$ between center lines of the inclined flow passages 107, 108, 109, 110, 111 and lines parallel to the central axis C are set to a relation of $\theta 1 < \theta 2 < \theta 3 < \theta 4 < \theta 5$.

In Modified Example 4 of the first embodiment, the pluralities of inclined flow passages 107, 108, 109, 110, 111 having different inclination angles are provided, and the inclination angles $\theta 1$, $\theta 2$, $\theta 3$, $\theta 4$, $\theta 5$ relative to the central axis C are set so as to become larger toward the downstream side in the flow direction of the swirling air current A1. Thus, air jetted out of the inclined flow passages 107, 108, 109, 110, 111 flows over a wide area of the front surface of the leading end surface cover 75b, so that the cover ring 75D can be efficiently cooled.

The inclination angles $\theta 1$, $\theta 2$, $\theta 3$, $\theta 4$, $\theta 5$ are larger toward the downstream side in the flow direction of the air current A1, and thus the inclination angles $\theta 1$, $\theta 2$, $\theta 3$, $\theta 4$, $\theta 5$ of the inclined flow passages 107, 108, 109, 110, 111 can be set to angles according to a surrounding structure, and a larger number of the inclined flow passages 107, 108, 109, 110, 111 can be provided at a desired position in the leading end surface cover 75b. Specifically, if the inclination angle of the inclined flow passage 107, which is located in the vicinity of the through-hole 80, is set to a large angle, the outlet 107b has to be provided at a position away from the through-hole 80, which makes it difficult to jet out air to the vicinity of the through-hole 80. Therefore, the inclination angle of the inclined flow passage 107 located in the vicinity of the through-hole 80 is set to a small angle so that the outlet 107b can be provided in the vicinity of the through-hole 80 and that air can be jetted out over a wide area of the leading end surface cover 75b.

Figure 18:
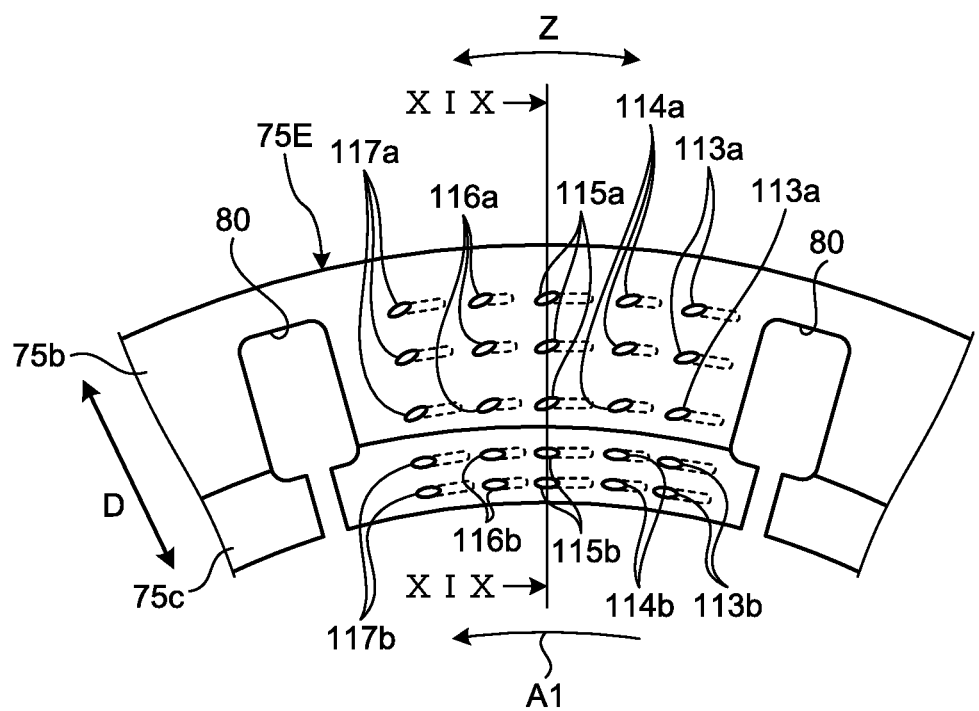
FIG. 18 is an enlarged front view of a part of a cover ring of Modified Example 5 of the first embodiment
Figure 19:
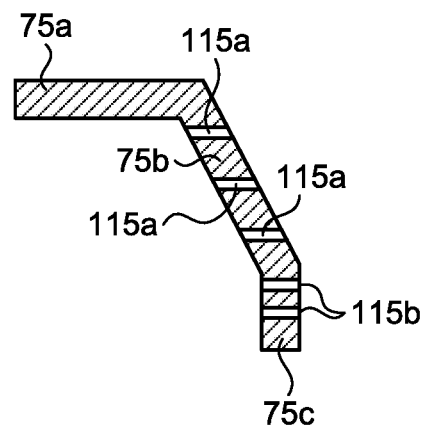
FIG. 19 is a sectional view taken along the line XIX-XIX of FIG. 18.
Figure 20:
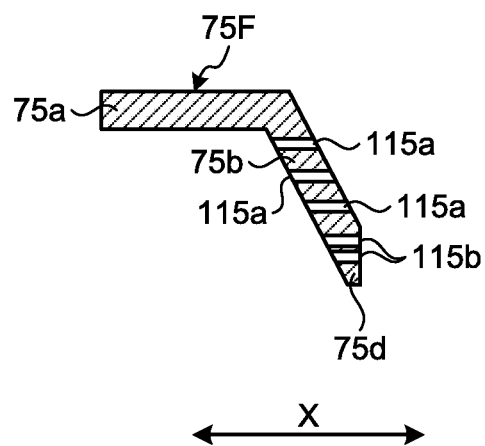
FIG. 20 is a sectional view of a cover ring of Modified Example 6 of the first embodiment.

FIG. 18 is an enlarged front view of a part of a cover ring of Modified Example 5 of the first embodiment, and FIG. 19 is a sectional view taken along the line XIX-XIX of FIG. 18. FIG. 20 is a sectional view of a cover ring of Modified Example 6 of the first embodiment.

In Modified Example 5 of the first embodiment, as shown in FIG. 18 and FIG. 19, a cover ring 75E is provided with pluralities of inclined flow passages 113a, 114a, 115a, 116a, 117a that extend through the leading end surface cover 75b in the thickness direction and are inclined in a predetermined direction relative to the central axis direction X, and with pluralities of inclined flow passages 113b, 114b, 115b, 116b, 117b. The pluralities of inclined flow passages 113a, 114a, 115a, 116a, 117a and the pluralities of inclined flow passages 113b, 114b, 115b, 116b, 117b are arrayed between the adjacent through-holes 80 in the circumferential direction Z and the radial direction D so as to form a lattice pattern. In addition, the pluralities of inclined flow passages 113a, 114a, 115a, 116a, 117a and the pluralities of inclined flow passages 113b, 114b, 115b, 116b, 117b are arrayed radially (along the radial direction D) from the central axis C (see FIG. 1).

The cover ring 75E has the outer circumferential surface cover 75a, the first leading end surface cover 75b, and the second leading end surface cover 75c. Thus, in the cover ring 75E, the inclined first front surface of the first leading end surface cover 75b and the horizontal second front surface of the second leading end surface cover 75c are set to different angles. The pluralities of inclined flow passages 113a, 114a, 115a, 116a, 117a are provided in the first leading end surface cover 75b, while the pluralities of inclined flow passages 113b, 114b, 115b, 116b, 117b are provided in the second leading end surface cover 75c, and each inclined flow passage is inclined along the circumferential direction Z of the cover ring 75E. As in the modified examples described above, the inclined flow passages 113a, 114a, 115a, 116a, 117a, 113b, 114b, 115b, 116b, 117b are through-holes having a circular cross-section and extending through the leading end surface covers 75b, 75c of the cover ring 75E in the plate thickness direction, and an outlet of each inclined flow passage is located on the downstream side of the swirling air current A1 relative to an inlet thereof.

In Modified Example 6 of the first embodiment, as shown in FIG. 20, a cover ring 75F has the outer circumferential surface cover 75a, the first leading end surface cover 75b, and a second leading end surface cover 75d. Thus, in the cover ring 75F, the inclined first front surface of the first leading end surface cover 75b and the horizontal second front surface of the second leading end surface cover 75d are set to different angles, while the inclined rear surfaces of the leading end surface covers 75b, 75d are set to the same angle. The pluralities of inclined flow passages 113a, 114a, 115a, 116a, 117a are provided in the first leading end surface cover 75b, while the pluralities of inclined flow passages 113b, 114b, 115b, 116b, 117b are provided in the second leading end surface cover 75d.

In Modified Examples 6 and 7 of the first embodiment, the outer circumferential surface cover 75a, the first leading end surface cover 75b, and the second leading end surface covers 75c, 75d are provided as the cover rings 75E, 75F, and the inclined flow passages 113a, 114a, 115a, 116a, 117a, 113b, 114b, 115b, 116b, 117b are provided in the first leading end surface cover 75b and the second leading end surface covers 75c, 75d so as to open in the front surfaces. Thus, the inclined flow passages 113a, 114a, 115a, 116a, 117a, 113b, 114b, 115b, 116b, 117b are open in the two front surfaces having different angles, so that air jetted out of the inclined flow passages 113a, 114a, 115a, 116a, 117a, 113b, 114b, 115b, 116b, 117b can flow efficiently along the front surfaces of the leading end surface covers 75c, 75d.

Figure 21:
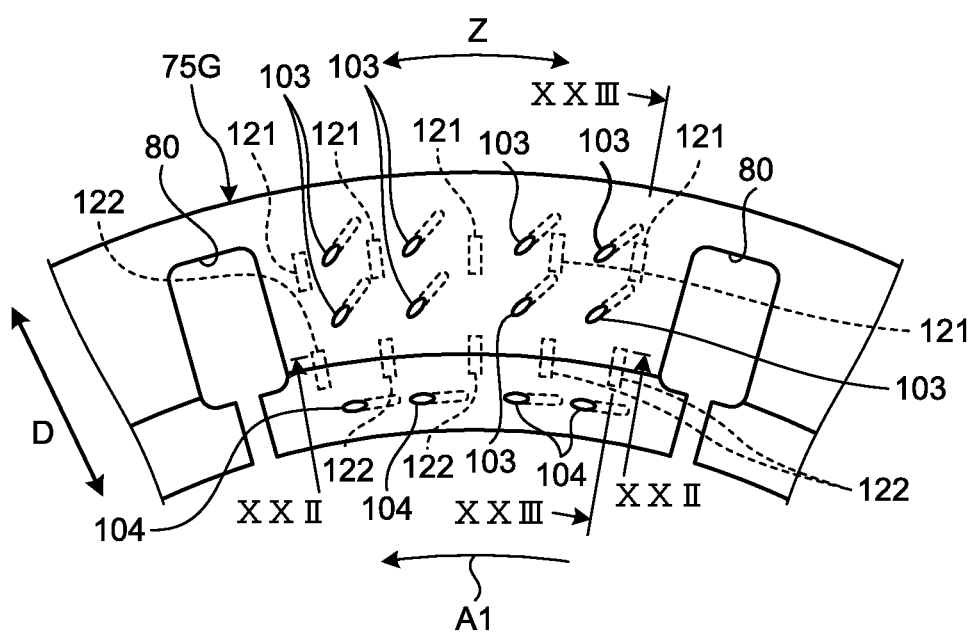
FIG. 21 is an enlarged front view of a part of a cover ring of Modified Example 7 of the first embodiment.
Figure 22:
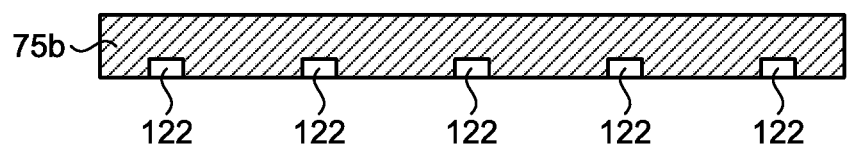
FIG. 22 is a sectional view taken along the line XXII-XXII of FIG. 21.

FIG. 21 is an enlarged front view of a part of a cover ring of Modified Example 7 of the first embodiment; FIG. 22 is a sectional view taken along the line XXII-XXII of FIG. 21; and FIG. 23 is a sectional view taken along the line XXIII-XXIII of FIG. 21.

Figure 23:
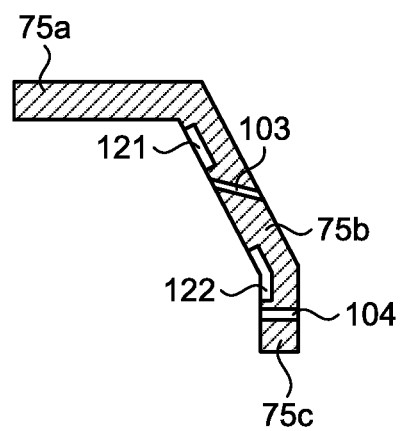
FIG. 23 is a sectional view taken along the line XXIII-XXIII of FIG. 21.
Figure 23:
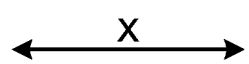

In Modified Example 7 of the first embodiment, as shown in FIG. 21 to FIG. 23, a cover ring 75G is provided with the pluralities of inclined flow passages 103, 104 that extend through the leading end surface covers 75b, 75c in the thickness direction and are inclined in predetermined directions relative to the central axis direction X. The pluralities of inclined flow passages 103, 104 are arrayed between the adjacent through-holes 80 in the circumferential direction Z and the radial direction D so as to form a lattice pattern.

The cover ring 75G has the outer circumferential surface cover 75a, the first leading end surface cover 75b, and the second leading end surface cover 75c. The plurality of inclined flow passages 103 are provided in the first leading end surface cover 75b, and are inclined along a direction that is inclined at a predetermined angle (e.g., 45 degrees) relative to the radial direction D and the circumferential direction Z of the cover ring 75G. The plurality of inclined flow passages 104 are provided in the second leading end surface cover 75c and inclined along the circumferential direction Z of the cover ring 75G.

The cover ring 75G is further provided with pluralities of grooves 121, 122 that are located in the rear surfaces of the leading end surface covers 75b, 75c and extend along the radial direction D. Specifically, the first leading end surface cover 75b is provided with the plurality of grooves 121 that are each located in the rear surface between the inclined flow passages 103 and extend along the radial direction D. The second leading end surface cover 75c is provided with the plurality of grooves 122 that are each located in the rear surface between the inclined flow passages 104 and extend along the radial direction D.

In Modified Example 7 of the first embodiment, the pluralities of grooves 121, 122 extending along the radial direction D are provided in the rear surfaces of the leading end surface covers 75b, 75c of the cover ring 75G. Thus, the area in which the air flowing through the inner air flow passage 76 comes in contact with the leading end surface covers 75b, 75c increases, so that the cooling performance of the cover ring 75G can be improved.

Second Embodiment

Figure 24:
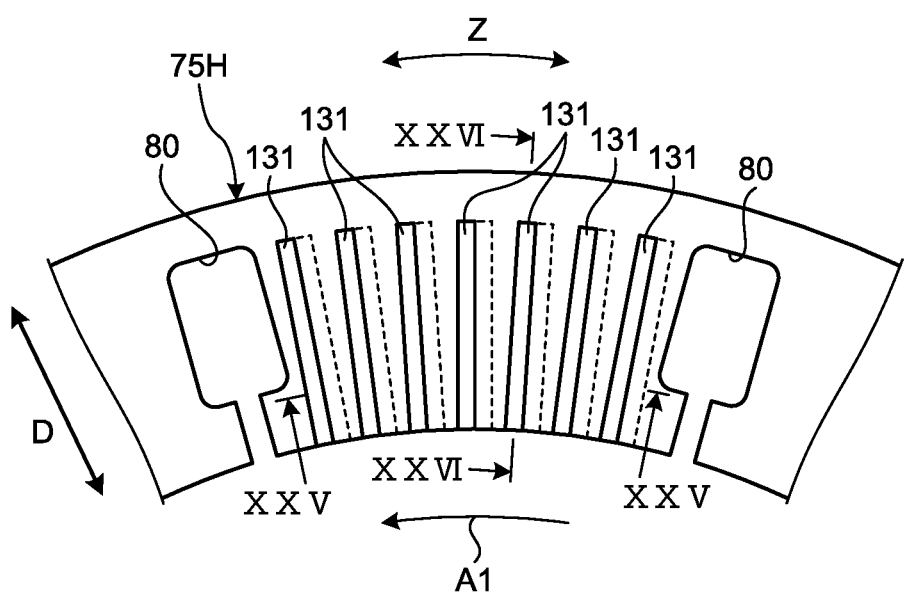
FIG. 24 is an enlarged front view of a part of a cover ring of a second embodiment.
Figure 25:
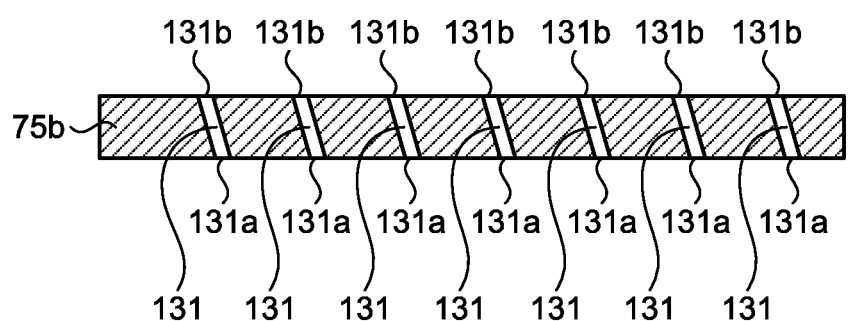
FIG. 25 is a sectional view taken along the line XXV-XXV of FIG. 24.
Figure 26:
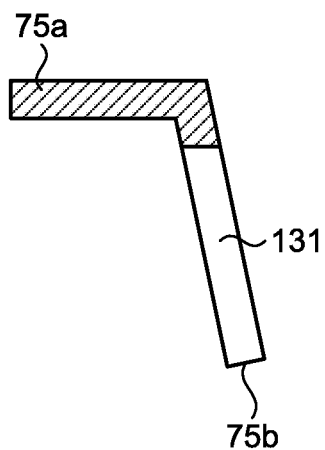
FIG. 26 is a sectional view taken along the line XXVI-XXVI of FIG. 24.

FIG. 24 is an enlarged front view of a part of a cover ring of a second embodiment; FIG. 25 is a sectional view taken along the line XXV-XXV of FIG. 24; and FIG. 26 is a sectional view taken along the line XXVI-XXVI of FIG. 24. Those members that have the same functions as in the first embodiment described above will be denoted by the same reference signs while detailed description thereof will be omitted.

As shown in FIG. 24 to FIG. 26, in the second embodiment, a cover ring 75H is provided with a plurality of inclined flow passages 131 that extend through the leading end surface cover 75b in the thickness direction and are inclined in a predetermined direction relative to the central axis direction X. The plurality of inclined flow passages 131 are arrayed between the adjacent through-holes 80 in series in the circumferential direction Z. The inclined flow passages 131 are slits extending along the radial direction D of the leading end surface cover 75b, and are arrayed radially (along the radial direction D) from the central axis C (see FIG. 1).

The plurality of inclined flow passages 131 extend along the radial direction D of the cover ring 75H and are inclined so as to face the downstream side of the swirling air current A1. One end in a longitudinal direction of each slit-shaped inclined flow passage 131 is open in the inner circumference of the leading end surface cover 75b.

Specifically, the inclined flow passages 131 are slits having a rectangular cross-section and extending through the leading end surface cover 75b of the cover ring 75H in the plate thickness direction. An outlet 131b of each inclined flow passage 131 that is open in the front surface of the leading end surface cover 75b is located on the downstream side of the swirling air current A1 relative to an inlet 131a thereof that is open in the rear surface of the leading end surface cover 75b, and each inclined flow passage 131 is a straight linear slit that provides communication between the inlet 131a and the outlet 131b.

Thus, the pilot nozzle of the second embodiment includes the nozzle body 71, the cover ring 75, and the fuel injection nozzles 79, and the cover ring 75H has the outer circumferential surface cover 75a that covers the outer circumferential surface of the nozzle body 71, the leading end surface cover 75b that covers the leading end surface of the nozzle body 71, and the plurality of inclined flow passages 131 that extend through the leading end surface cover 75b in the thickness direction and are inclined in a predetermined direction relative to the central axis C.

Accordingly, part of the air flowing through the inner air flow passage 76 is jetted out of the inclined flow passages 131 of the leading end surface cover 75b, and this jet of air flows along the front surface of the leading end surface cover 75b and thereby keeps a flame at a distance. As a result, the air jetted out of the inclined flow passages 131 does not disturb the air current jetted out of each of the air flow passages 76, 77, and the cover ring 75H is prevented from reaching a high temperature. Thus, it is possible to improve the cooling performance of the leading end part while securing the combustion stability.

In the pilot nozzle of the second embodiment, the inclined flow passages 131 are slits that extend through the cover ring 75H in the plate thickness direction and extend along the radial direction D. Thus, a large passage area can be secured, and a larger amount of air jetted out of the inclined flow passages 131 can flow along the front surface of the leading end surface cover 75b, so that the cooling performance can be improved.

In the pilot nozzle of the second embodiment, one end in the longitudinal direction of each slit-shaped inclined flow passage 131 is open in the inner circumference of the leading end surface cover 75b. Thus, the structure of the pilot nozzle can be simplified and the ease of manufacturing thereof can be improved.

Figure 27:
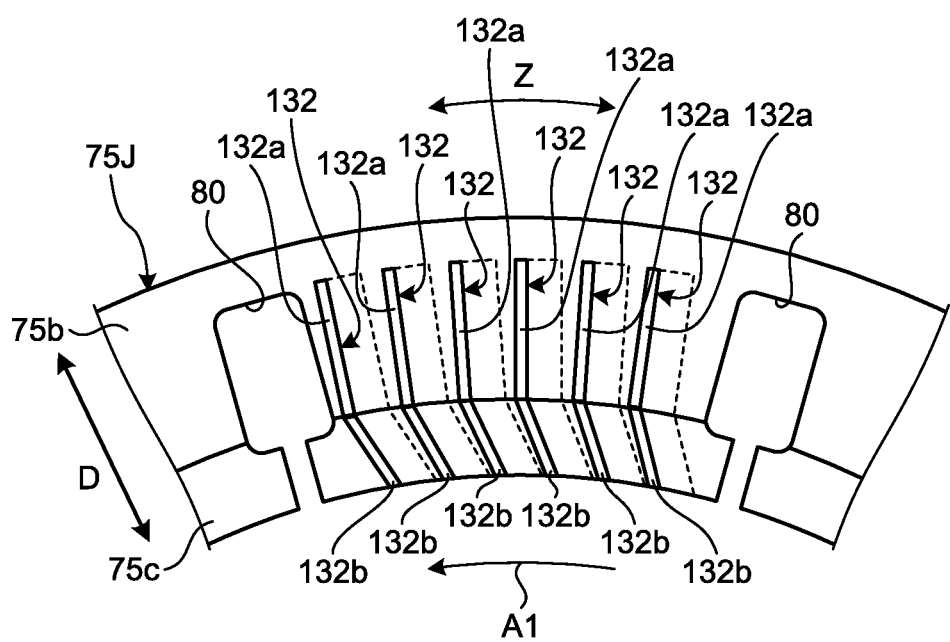
FIG. 27 is an enlarged front view of a part of a cover ring of Modified Example 1 of the second embodiment.

In the above embodiment, the plurality of inclined flow passages 131 that are inclined in the circumferential direction Z relative to the central axis direction X are provided as slits in the leading end surface cover 75b of the cover ring 75H, but the second embodiment is not limited to this configuration. FIG. 27 is an enlarged front view of a part of a cover ring of Modified Example 1 of the second embodiment.

In Modified Example 1 of the second embodiment, as shown in FIG. 27, a cover ring 75J is provided with a plurality of inclined flow passages 132 that extend through the leading end surface covers 75b, 75c in the thickness direction and are inclined in predetermined directions relative to the central axis direction X. The plurality of inclined flow passages 132 are arrayed between the adjacent through-holes 80 in series in the circumferential direction Z. The inclined flow passages 132 are slits extending along the radial direction D of the leading end surface covers 75b, 75c, and are arrayed radially (along the radial direction D) from the central axis C (see FIG. 1).

The cover ring 75J has the outer circumferential surface cover 75a, the first leading end surface cover 75b, and the second leading end surface cover 75c. The plurality of inclined flow passages 132 are provided across the border between the leading end surface covers 75b, 75c. Specifically, the plurality of inclined flow passages 132 are each formed by a first inclined flow passage 132a and a second inclined flow passage 132b communicating with each other. The first inclined flow passage 132a is provided in the first leading end surface cover 75b so as to be inclined along the circumferential direction Z, and is formed along the radial direction D of the cover ring 75J. The second inclined flow passage 132b is provided in the second leading end surface cover 75c so as to be inclined along the circumferential direction Z, and is formed so as to be inclined at a predetermined angle relative to the radial direction D of the cover ring 75J. One end in a longitudinal direction of the slit-shaped inclined flow passage 132 is open in the inner circumference of the second leading end surface cover 75c.

In Modified Example 1 of the second embodiment, the plurality of inclined flow passages 132 are provided across the border between the leading end surface covers 75b, 75c, and the second inclined flow passages 132b provided in the second leading end surface cover 75c are bent relative to the first inclined flow passages 132a provided in the first leading end surface cover 75b. Thus, air jetted out of the inclined flow passages 132 cools the front surfaces of the leading end surface covers 75b, 75c, and then this air appropriately merges with the air jetted out of the inner air flow passage 76, so that combustion stability can be secured.

Figure 28:
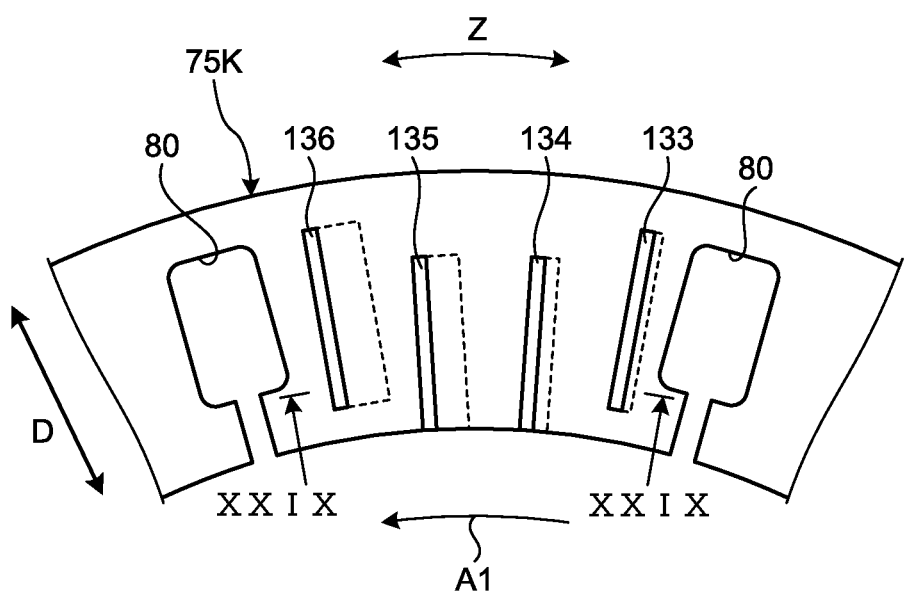
FIG. 28 is an enlarged front view of a part of a cover ring of Modified Example 2 of the second embodiment.
Figure 29:
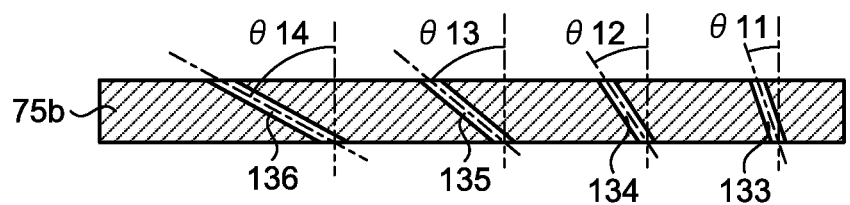
FIG. 29 is a sectional view taken along the line XXIX-XXIX of FIG. 28.

FIG. 28 is an enlarged front view showing a part of a cover ring of Modified Example 2 of the second embodiment, and FIG. 29 is a sectional view taken along the line XXIX-XXIX of FIG. 28.

In Modified Example 2 of the second embodiment, as shown in FIG. 28 and FIG. 29, a cover ring 75K is provided with a plurality of inclined flow passages 133, 134, 135, 136 that extend through the leading end surface cover 75b in the thickness direction and are inclined in predetermined directions relative to the central axis direction X. The plurality of inclined flow passages 133, 134, 135, 136 are arrayed between the adjacent through-holes 80 in series in the circumferential direction Z. The inclined flow passages 133, 134, 135, 136 are slits extending along the radial direction D of the leading end surface cover 75b, and are arrayed radially (along the radial direction D) from the central axis C (see FIG. 1).

The plurality of inclined flow passages 133, 134, 135, 136 are inclined along the circumferential direction Z of the cover ring 75K, and are inclined so as to face the downstream side of the swirling air current A1. The slit-shaped inclined flow passages 133, 134, 135, 136 are disposed so as to be shifted from one another in the radial direction D of the cover ring 75K. Moreover, inclination angles θ11, θ12, θ13, θ14 between center lines of the inclined flow passages 133, 134, 135, 136 and lines parallel to the central axis C are set to a relation of θ11<θ12<θ13<θ14.

In Modified Example 2 of the second embodiment, the plurality of inclined flow passages 133, 134, 135, 136 having different inclination angles are provided, and the inclination angles θ11, θ12, θ13, θ14 relative to the central axis C are set so as to become larger toward the downstream side in the flow direction of the swirling air current A1. Thus, air jetted out of the inclined flow passages 133, 134, 135, 136 flows over a wide area of the front surface of the leading end surface cover 75b, so that the cover ring 75K can be efficiently cooled.

Figure 30:
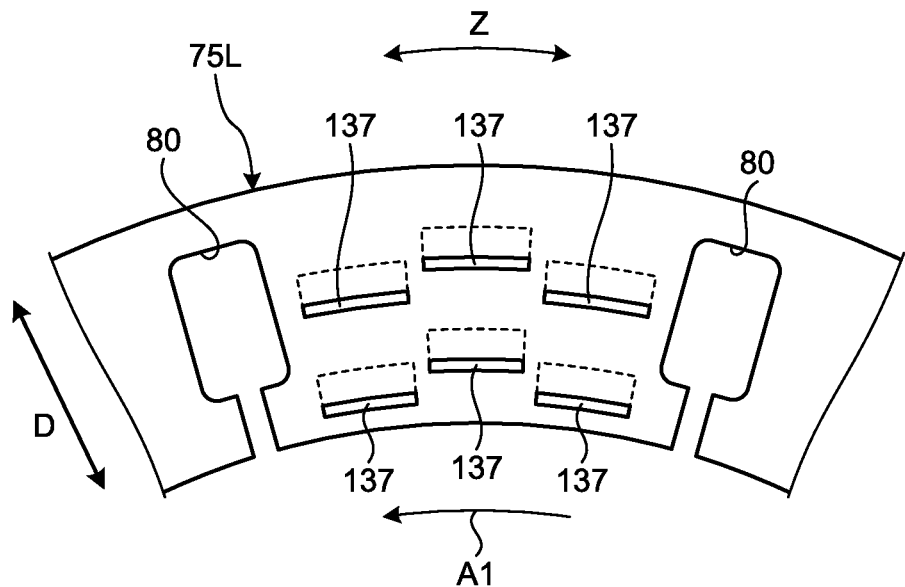
FIG. 30 is an enlarged front view of a part of a cover ring of Modified Example 3 of the second embodiment.

FIG. 30 is an enlarged front view of a part of a cover ring of Modified Example 3 of the second embodiment.

In Modified Example 3 of the second embodiment, as shown in FIG. 30, a cover ring 75L is provided with a plurality of inclined flow passages 137 that extend through the leading end surface cover 75b in the thickness direction and are inclined in a predetermined direction relative to the central axis direction X. The plurality of inclined flow passages 137 are arrayed between the adjacent through-holes 80 in the circumferential direction Z and the radial direction D so as to form a staggered pattern. The inclined flow passages 137 are slits extending along the circumferential direction Z of the leading end surface cover 75b, and are arrayed radially (along the radial direction D) from the central axis C (see FIG. 1). The plurality of inclined flow passages 137 extend along the circumferential direction Z of the cover ring 75L and are inclined so as to face the central axis C in the radial direction D.

In Modified Example 3 of the second embodiment, the slit-shaped inclined flow passages 137 extend along the radial direction D of the cover ring 75L and are inclined so as to face the direction of the central axis C. Thus, air jetted out of the inclined flow passages 137 cools the front surface of the leading end surface cover 75b, and then this air appropriately merges with the air jetted out of the inner air flow passage 76, so that the combustion stability can be secured.

Figure 31:
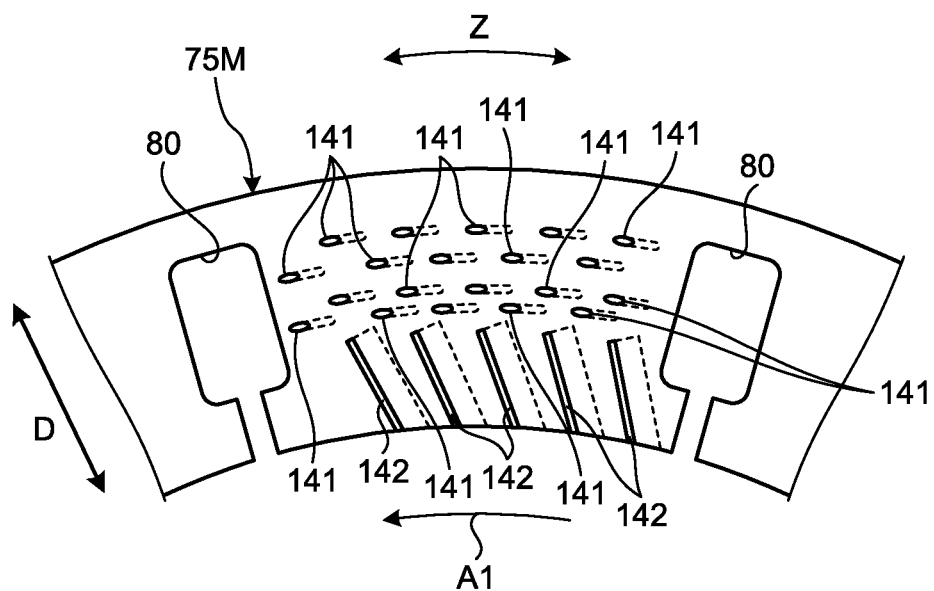
FIG. 31 is an enlarged front view of a part of a cover ring of Modified Example 4 of the second embodiment.

FIG. 31 is an enlarged front view of a part of a cover ring of Modified Example 4 of the second embodiment.

In Modified Example 4 of the second embodiment, as shown in FIG. 31, a cover ring 75M is provided with pluralities of inclined flow passages 141, 142 that extend through the leading end surface cover 75b in the thickness direction and are inclined in predetermined directions relative to the central axis direction X. The pluralities of inclined flow passages 141, 142 are disposed between the adjacent through-holes 80. The inclined flow passages 141 are through-holes and provided on the outer circumferential side in the leading end surface cover 75b, while the inclined flow passages 142 are pass-through slits and provided on the inner circumferential side in the leading end surface cover 75b.

The plurality of inclined flow passages 141 are inclined along the circumferential direction Z of the cover ring 75M and inclined so as to face the downstream side of the swirling air current A1. The plurality of inclined flow passages 142 extend along the radial direction D of the cover ring 75M and are inclined so as to face the downstream side of the air current A1 swirling along the circumferential direction Z.

In Modified Example 4 of the second embodiment, the inclined flow passages 141 formed as through-holes and the inclined flow passages 142 formed as slits are provided. Thus, the front surface of the leading end surface cover 75b can be efficiently cooled with air jetted out of the inclined flow passages 141, 142 having different shapes, so that the cooling performance of the cover ring 75M can be improved.

In the above embodiments, the examples and the modified examples may be combined as appropriate. For example, the inclined passages of the first embodiment and Modified Example 1 thereof may be applied to the cover ring of Modified Example 2. Modified Example 4 and Modified Example 5, or Modified Example 4 and Modified Example 6 of the first embodiment may be combined. Moreover, the grooves of Modified Example 7 of the first embodiment may be applied to the other modified examples or the second embodiment.

Third Embodiment

Figure 32:
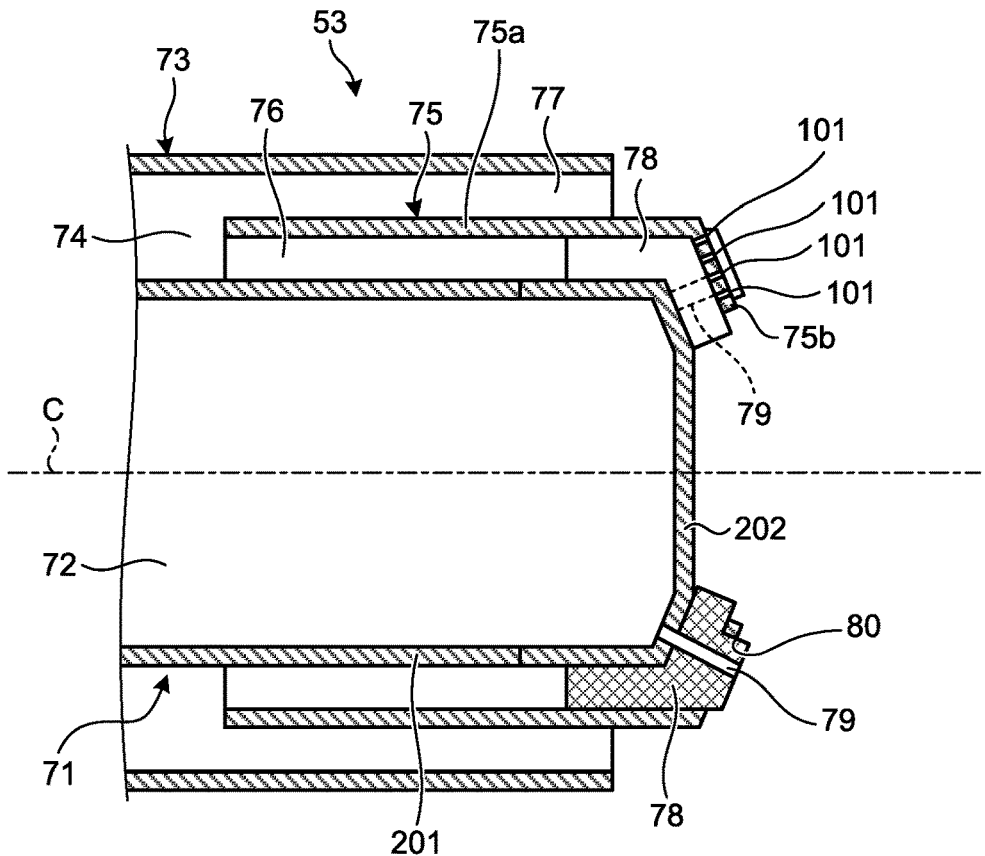
FIG. 32 is a sectional view showing a leading end part of a pilot nozzle of a third embodiment.
Figure 33:
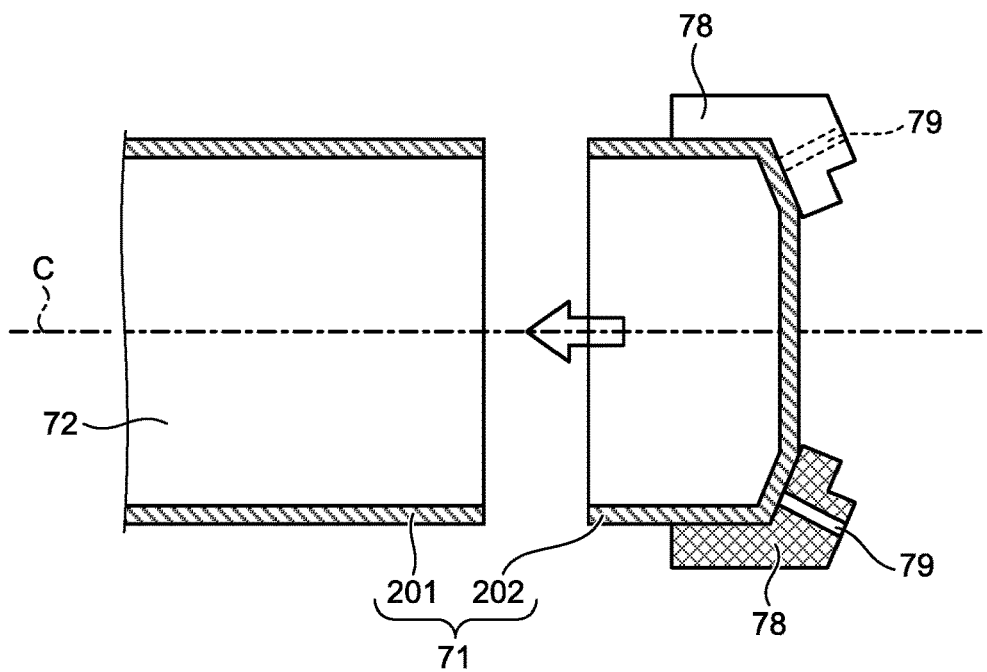
FIG. 33 is a schematic view showing a pilot nozzle manufacturing method.
Figure 34:
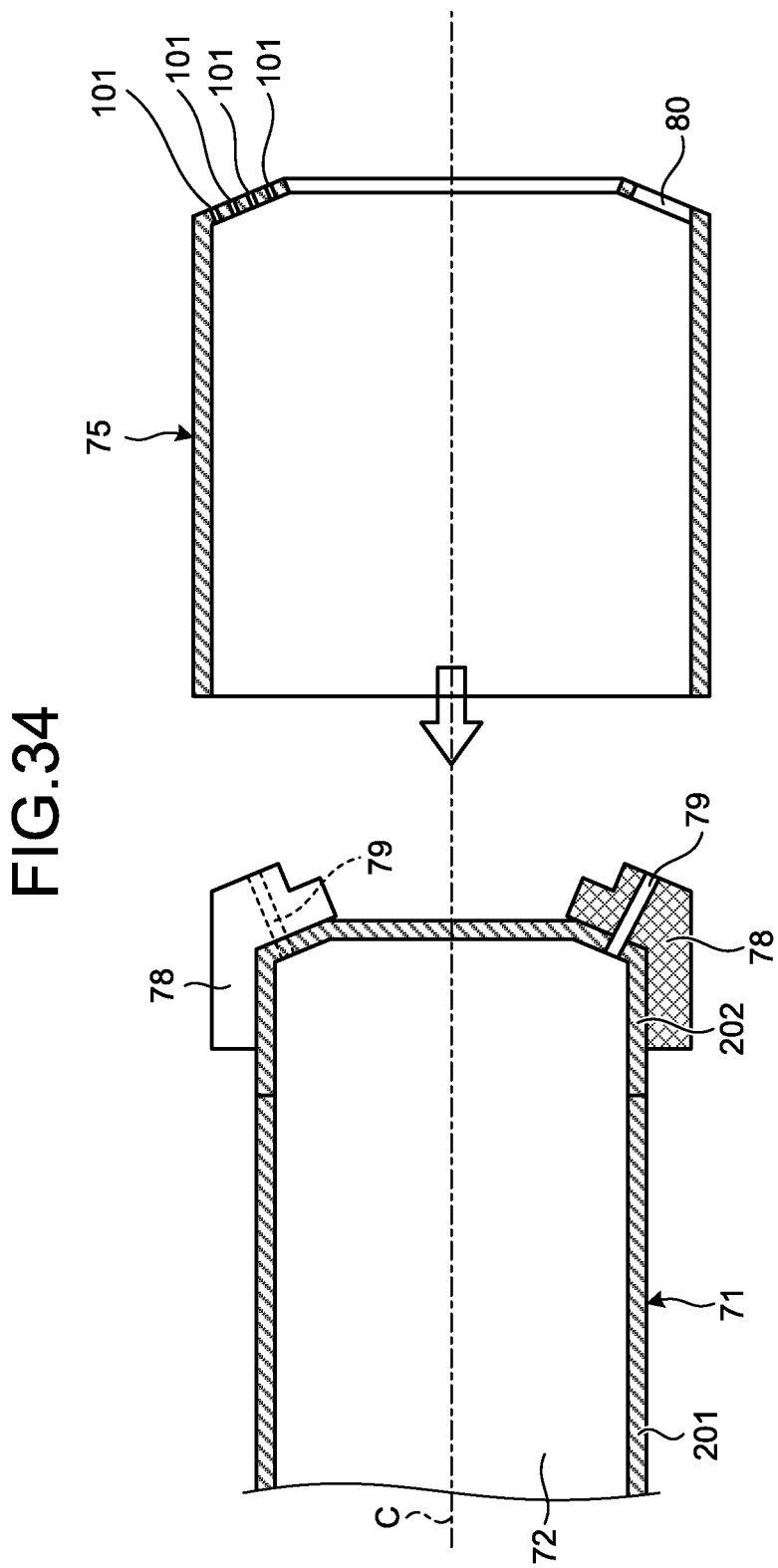
FIG. 34 is a schematic view showing the pilot nozzle manufacturing method.

FIG. 32 is a sectional view showing a leading end part of a pilot nozzle of a third embodiment, and FIG. 33 to FIG. 35 are schematic views showing a pilot nozzle manufacturing method. Those members that have the same functions as in the above embodiments will be denoted by the same reference signs while detailed description thereof will be omitted.

In the third embodiment, as shown in FIG. 32, the nozzle body 71 of the pilot nozzle 53 has a hollow cylindrical shape and is disposed along the central axis C. The fuel flow passage 72 is provided inside the nozzle body 71. A cylindrical sleeve 73 is coaxially disposed on the outer side of the nozzle body 71 with a predetermined clearance thereto, and the air flow passage 74 is provided between the nozzle body 71 and the sleeve 73. The cover ring 75 is disposed on the leading end part side of the nozzle body 71. The cover ring 75 has a cylindrical shape, and is disposed inside the air flow passage 74 on the outer side of the nozzle body 71 with a predetermined clearance thereto, and the leading end part of the cover ring 75 is bent toward the inner side (toward the central axis C).

Specifically, the nozzle body 71 is formed by joining together a base end part 201 and a leading end part 202. The base end part 201 has a cylindrical shape, and the leading end part 202 has a cylindrical shape and has one end closed. More specifically, a leading end of the leading end part 202 is bent toward the inner side (toward the central axis C) so as to form a conical shape, and the leading end is closed. The cover ring 75 has the outer circumferential surface cover 75a located on the outer side of the nozzle body 71, and the leading end surface cover 75b that is inclined from the leading end part of the outer circumferential surface cover 75a toward the side of the central axis C and the leading end part side. As the cover ring 75 is disposed between the nozzle body 71 and the sleeve 73, the leading end part of the air flow passage 74 is divided by the cover ring 75 into the inner air flow passage 76 and the outer air flow passage 77.

In the nozzle body 71, the plurality of nozzle tips 78 are fixed to the surface of the leading end part 202 on the leading end side at predetermined intervals in the circumferential direction. The fuel injection nozzles 79 are provided so as to respectively extend through the nozzle tips 78. Each fuel injection nozzle 79 is inclined at a predetermined angle relative to the central axis C so that the leading end part is directed toward the outer side. The base end part of each fuel injection nozzle 79 communicates with the fuel flow passage 72, while the leading end part thereof is open to the outside. The plurality of through-holes 80 are formed in the leading end surface cover 75b of the cover ring 75 at predetermined intervals (regular intervals) in the circumferential direction, and the leading end parts of the nozzle tips 78 are respectively fitted in the through-holes 80.

As the pilot nozzle 53 is disposed at the central part of the combustor 12 (see FIG. 8 and FIG. 9), a high-temperature flame is formed in the vicinity of the leading end part of the pilot nozzle 53, and this leading end part is heated by the flame to a high temperature. While the plurality of nozzle tips 78 are protected by being covered with the cover ring 75, the cover ring 75 itself reaches a high temperature. Therefore, the cover ring 75 is provided with the plurality of inclined flow passages 101, and part of the air flowing through the inner air flow passage 76 is jetted out of the inclined flow passages 101 through the surface of the cover ring 75 to thereby cool the cover ring 75. The inclined flow passages 101 extend through the leading end surface cover 75b in the thickness direction and are inclined along the circumferential direction of the cover ring 75 relative to the central axis C.

Now, a manufacturing method of the pilot nozzle 53 of the third embodiment will be described.

The combustor nozzle manufacturing method of this embodiment includes steps of mounting the nozzle tips 78 and the fuel injection nozzles 79 on the leading end part of the nozzle body 71, and mounting the cover ring 75 on the outer side of the outer circumference of the leading end of the nozzle body 71 with a predetermined clearance thereto. The cover ring 75 has the outer circumferential surface cover 75a that has a cylindrical shape and covers the outer circumferential surface of the nozzle body 71, the leading end surface cover 75b that has an annular shape and covers the leading end surface of the nozzle body 71, and the inclined flow passages 101 that extend through the leading end surface cover 75b in the thickness direction and are inclined in a predetermined direction relative to the central axis C of the nozzle body 71.

Specifically, first, as shown in FIG. 33, the base end part 201 and the leading end part 202 of the nozzle body 71 and the plurality of nozzle tips 78 are prepared, and the nozzle tips 78 are fixed by welding to the leading end part 202 of the nozzle body 71 at predetermined intervals in the circumferential direction. Here, the plurality of fuel injection nozzles 79 are formed by drilling the leading end part 202 of the nozzle body 71 and the nozzle tips 78. Then, the leading end of the base end part 201 of the nozzle body 71 and the base end of the leading end part 202 of the nozzle body 71 having the plurality of nozzle tips 78 fixed thereto are butted together, and the base end part 201 and the leading end part 202 of the nozzle body 71 are assembled by welding, and thus the nozzle tips 78 and the fuel injection nozzles 79 are provided in the leading end part of the nozzle body 71.

Next, as shown in FIG. 34, the cover ring 75 that is composed of the outer circumferential surface cover 75a and the leading end surface cover 75b and is provided with the through-holes 80 and the inclined flow passages 101 in the leading end surface cover 75b is prepared. Then, the cover ring 75 is placed around the nozzle body 71 from the leading end side of the nozzle body 71 with a predetermined clearance thereto. The cover ring 75 is fitted on the nozzle tips 78, and the cover ring 75 and the nozzle tips 78 are assembled by welding. Thus, the air flow passage 74 and the inner air flow passage 76 are formed.

Finally, as shown in FIG. 35, the sleeve 73 is prepared, and the sleeve 73 is placed around the cover ring 75 from the leading end side of the cover ring 75 with a predetermined clearance thereto, and the sleeve 73 is connected by welding to the nozzle body 71 through the spacers (not shown). Thus, the outer air flow passage 77 is formed.

Thus, the combustor nozzle manufacturing method of the third embodiment includes the steps of mounting the nozzle tips 78 and the fuel injection nozzles 79 on the leading end part of the nozzle body 71, and mounting the cover ring 75 having the outer circumferential surface cover 75a, the leading end surface cover 75b, and the inclined flow passages 101 on the outer side of the outer circumference of the leading end of the nozzle body 71 with a predetermined clearance thereto. Accordingly, the cover ring 75 provided with the inclined flow passages 101 can be easily installed on the nozzle body 71, and it is possible to improve the cooling performance of the pilot nozzle 53 as well as to improve the ease of installation.

In the above third embodiment, the combustor nozzle manufacturing method in which the cover ring 75 provided with the inclined flow passages 101 is installed on the nozzle body 71 is described. However, the combustor nozzle manufacturing method may be a method in which the sleeve 73 is removed and an old cover ring that is not provided with the inclined flow passages 101 is removed from the nozzle body 71, and then a new cover ring 75 provided with the inclined flow passages 101 is installed on the nozzle body 71 and the sleeve 73 is mounted.

In the above embodiments, the fuel flow passage 72 is provided inside the nozzle body 71 and the leading end part of the fuel flow passage 72 is closed, but the nozzle body 71 is not limited to this configuration. For example, a first fuel flow passage may be provided inside the nozzle body 71 and a leading end part of this first fuel flow passage may be opened inward, and a cylindrical second fuel flow passage may be provided on the outer circumference of the nozzle body 71 so as to communicate with the fuel injection nozzles 79, and a gas fuel and a liquid fuel may be supplied respectively to the first fuel flow passage and the second fuel flow passage.

In each of the above embodiments, the combustor nozzle of the present invention is applied to a pilot nozzle, but the combustor nozzle may instead be applied to, for example, a diffusion nozzle having a different configuration.

REFERENCE SIGNS LIST

11 Compressor
12 Combustor (gas turbine combustor)
13 Turbine
41 Combustor external cylinder
42 Combustor basket (cylinder)
43 Combustor transition piece
44 Pilot combustion burner
45 Main combustion burner
52 Pilot cone
53 Pilot nozzle (combustor nozzle)
54 Swirler
71 Nozzle body
72 Fuel flow passage
75 Cover ring
75a Outer circumferential surface cover
75b Leading end surface cover, first leading end surface cover
75c, 75d Second leading end surface cover
76 Inner air flow passage
77 Outer air flow passage
78 Nozzle tip
79 Fuel injection nozzle
80 Through-hole
81 Guide part (swirling force application part)
82 Guide surface
101, 102, 103, 104, 105, 106, 107, 108, 109, 110, 111, 113a, 113b, 114a, 114b, 115a, 115b, 116a, 116b, 117a, 117b, 131, 132, 133, 134, 135, 136, 137, 141, 142 Inclined flow passage
121, 122 Groove

The invention claimed is:
1. A combustor nozzle, comprising:
a nozzle body that is provided with a fuel flow passage and extends in a rod shape;

a cover ring that is disposed on an outer side of an outer circumference of a leading end of the nozzle body with a predetermined clearance thereto so as to form an air flow passage that allows air to jet out toward a front side; and fuel injection nozzles that are provided in a leading end part of the nozzle body at predetermined intervals in a circumferential direction and extend through the cover ring so as to be able to inject fuel from the fuel flow passage toward the front side, wherein the cover ring has:

an outer circumferential surface cover that has a cylindrical shape and covers an outer circumferential surface of the nozzle body;

a leading end surface cover that has an annular shape and covers a leading end surface of the nozzle body; and inclined flow passages that extend through the leading end surface cover in a thickness direction and are inclined in a predetermined direction relative to a central axis direction of the nozzle body.

2. The combustor nozzle according to claim 1, wherein the inclined flow passages are inclined along a circumferential direction of the cover ring.

3. The combustor nozzle according to claim 2, further comprising a swirling force application part that applies a swirling force to an air current flowing through the air flow passage, wherein the inclined flow passages are inclined along a direction in which air is swirled by the swirling force application part.

4. The combustor nozzle according to claim 3, wherein the inclined flow passages are composed of a plurality of inclined flow passages having different inclination angles.

5. The combustor nozzle according to claim 4, wherein the inclination angles of the plurality of inclined flow passages are set so as to become larger toward a downstream side in the direction in which air is swirled by the swirling force application part.

6. The combustor nozzle according to claim 1, wherein the inclined flow passages are inclined relative to a direction perpendicular to a surface of the cover ring.

7. The combustor nozzle according to claim 1, wherein the inclined flow passages are through-holes that extend through the cover ring in a plate thickness direction.

8. The combustor nozzle according to claim 1, wherein the inclined flow passages are slits that extend through the cover ring in the plate thickness direction and extend along a radial direction of the cover ring.

9. The combustor nozzle according to claim 8, wherein one end in a longitudinal direction of each of the slits is open in an inner circumference of the leading end surface cover.

10. The combustor nozzle according to claim 1, wherein the leading end surface cover is provided with a first front surface that is orthogonal to the central axis direction and a second front surface that is inclined relative to a direction orthogonal to the central axis direction, and the inclined flow passages are open in the first front surface and the second front surface.

11. The combustor nozzle according to claim 10, wherein an inclination direction of the inclined flow passages provided in the first front surface and an inclination direction of the inclined flow passages provided in the second front surface are different from each other.

12. The combustor nozzle according to claim 1, wherein the inclined flow passages extend along the radial direction of the cover ring and are inclined so as to face the central axis direction.

13. The combustor nozzle according to claim 1, wherein the cover ring has a plurality of grooves that are provided in a rear surface of the leading end surface cover and extend along the radial direction of the leading end surface cover.

14. A gas turbine combustor, comprising:

a cylinder in which high-pressure air and fuel are combusted to generate combustion gas;

a pilot combustion burner that is disposed at a central part inside the cylinder; and a plurality of main combustion burners that are disposed so as to surround the pilot combustion burner inside the cylinder, wherein the pilot combustion burner has the combustor nozzle according to claim 1.

15. A gas turbine, comprising:

a compressor that compresses air;

the gas turbine combustor according to claim 14 that mixes together compressed air compressed by the compressor and fuel and combusts the mixture; and a turbine that produces rotary power from combustion gas generated by the gas turbine combustor.

16. A cover ring, comprising:

an outer circumferential surface cover that has a cylindrical shape with a central axis;

a leading end surface cover that has an annular shape inclined from a leading end part of the outer circumferential surface cover toward a central axis side and a leading end side;

a through-hole that extends through the leading end surface cover in a thickness direction;

inclined flow passages that extend through the leading end surface cover in the thickness direction and are inclined in a predetermined direction relative to the central axis, wherein the cover ring is configured to be disposed on an outer side of an outer circumference of a leading end of a nozzle body with a predetermined clearance thereto so as to form an air flow passage that allows air to jet out toward a front side.

17. The cover ring according to claim 16, wherein a plurality of through-holes are provided at predetermined intervals in a circumferential direction of the leading end surface cover, and more than one of the inclined flow passages are provided between the plurality of through-holes.

18. The cover ring according to claim 16, wherein the inclined flow passages are inclined along the circumferential direction of the leading end surface cover.

19. The cover ring according to claim 16, wherein the inclined flow passages are composed of a plurality of inclined flow passages having different inclination angles.

20. The cover ring according to claim 16, wherein the through-hole has an inlet that is open in a rear surface of the leading end surface cover and an outlet that is open in a front surface of the leading end surface cover, the through-hole providing communication between the inlet and the outlet, and wherein each inclined flow passage has an inlet that is open in the rear surface of the leading end surface cover and an outlet that is open in the front surface of the leading end surface cover and provides communication between the inlet and the outlet.

21. A combustor nozzle manufacturing method comprising mounting a cover ring on an outer side of an outer circumference of a leading end of a nozzle body with a predetermined clearance thereto, the cover ring having an outer circumferential surface cover that has a cylindrical shape and covers an outer circumferential surface of the nozzle body, a leading end surface cover that has an annular shape and covers a leading end surface of the nozzle body, a through-hole that extends through the leading end surface cover in a thickness direction, and inclined flow passages that extend through the leading end surface cover in the thickness direction and are inclined in a predetermined direction relative to a central axis direction of the nozzle body, wherein the through-hole has an inlet that is open in a rear surface of the leading end surface cover and an outlet that is open in a front surface of the leading end surface cover, the through-hole providing communication between the inlet and the outlet, and wherein each inclined flow passage has an inlet that is open in the rear surface of the leading end surface cover and an outlet that is open in the front surface of the leading end surface cover and provides communication between the inlet and the outlet.

\* \* \* \* \*